(12) United States Patent
Lacy et al.

(10) Patent No.: US 8,131,579 B2
(45) Date of Patent: Mar. 6, 2012

(54) WEB-BASED SYSTEM AND APPLICATION FOR COLLABORATIVE PLANNING OF A NETWORKED PROGRAM SCHEDULE

(75) Inventors: Jackson S. Lacy, Tucson, AZ (US);
Michael L. Ruehl, Tucson, AZ (US);
Shane P. McMurray, Tucson, AZ (US);
Richard M. Howard, Tucson, AZ (US);
Lisa Johnson, Corona, AZ (US);
Stephanie L. Hartman, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1274 days.

(21) Appl. No.: 11/775,029

(22) Filed: Jul. 9, 2007

(65) Prior Publication Data
US 2009/0018886 A1 Jan. 15, 2009

(51) Int. Cl.
*G06F 17/60* (2006.01)
(52) U.S. Cl. .................................................. 705/7.23
(58) Field of Classification Search .............. 705/7, 7.23
See application file for complete search history.

(56) References Cited

U.S. PATENT DOCUMENTS

| | | | | |
|---|---|---|---|---|
| 5,603,020 A | * | 2/1997 | Hashimoto et al. | 707/200 |
| 5,826,252 A | * | 10/1998 | Wolters et al. | 707/1 |
| 6,101,481 A | * | 8/2000 | Miller | 705/9 |
| 6,161,113 A | * | 12/2000 | Mora et al. | 715/505 |
| 6,308,164 B1 | * | 10/2001 | Nummelin et al. | 705/9 |
| 6,351,734 B1 | * | 2/2002 | Lautzenheiser et al. | 705/8 |
| 6,581,040 B1 | * | 6/2003 | Wright et al. | 705/8 |
| 2004/0162750 A1 | * | 8/2004 | Motoyama | 705/9 |

OTHER PUBLICATIONS

Leung "A Conceptual Model for Web-based Construction Project Management) discloses a web-based construction management system", Dec. 2002, pp. 1-198.*
Jose "(Interface Design and Multivariate Analysis of Unix Command Use) discloses the concept of identifying circular links", Mar. 1984, ACM Transaction on Office Information Systems, pp. 1-16.*

* cited by examiner

*Primary Examiner* — Romain Jeanty
(74) *Attorney, Agent, or Firm* — Eric A. Gifford

(57) ABSTRACT

An automated web-based system and application manages the creation, sharing and validation of program schedule data collaboratively among multiple teams in a structured manner to generate a networked program schedule such as for an events-based IMP/IMS. The Integrated Planning Solution (IPS) application provides a structured approach to large events-based planning that is time and cost efficient, produces well-managed, adequate and realistic schedules, is repeatable from project-to-project and can leverage information from previous projects. A focus of the IPS application is collaborative planning of the 'accomplishment criteria' for level 3 in an events-based program.

24 Claims, 23 Drawing Sheets

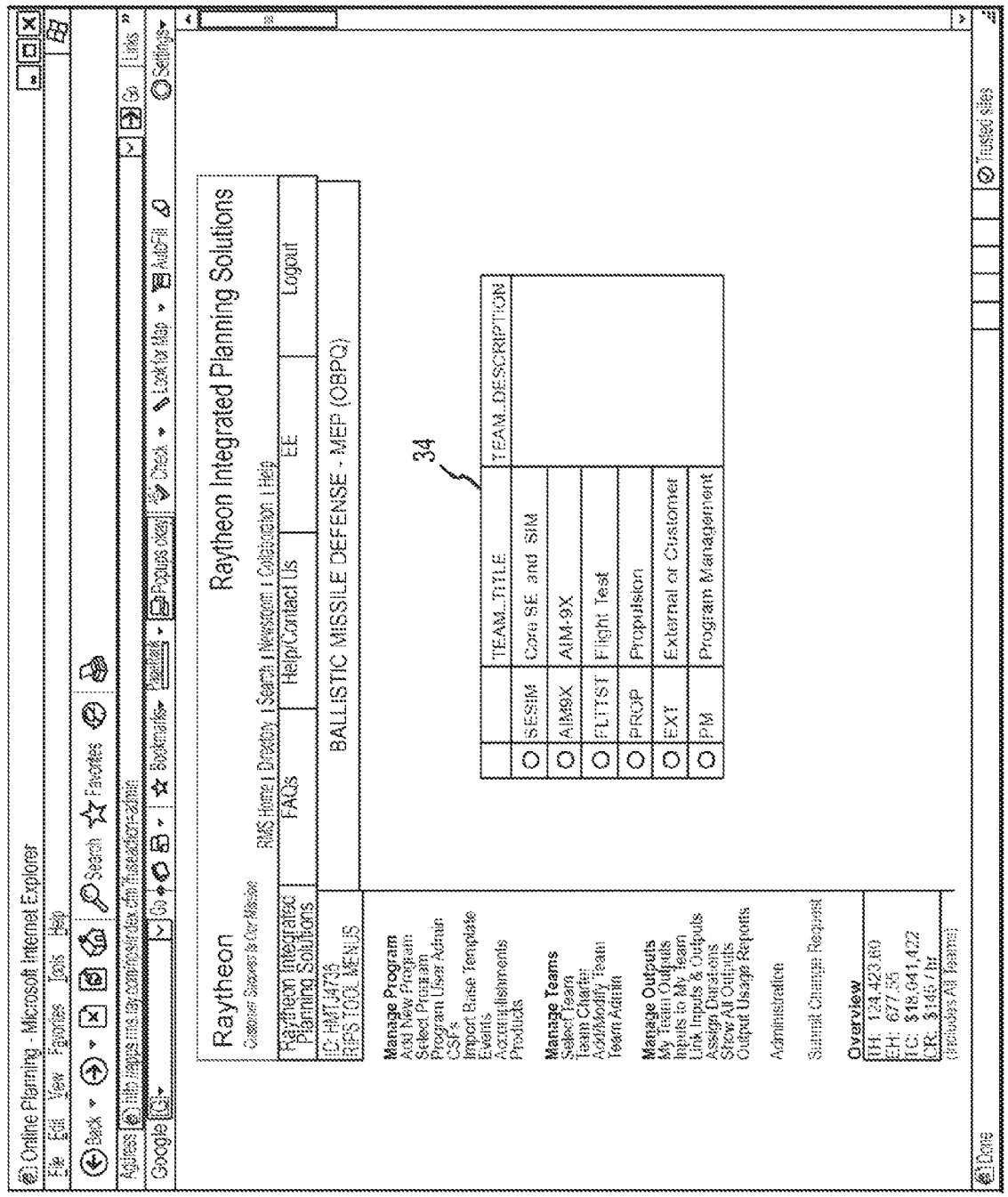

FIG. 16

WEB-BASED SYSTEM AND APPLICATION FOR COLLABORATIVE PLANNING OF A NETWORKED PROGRAM SCHEDULE

BACKGROUND OF THE INVENTION

1. Field of the Invention

This invention relates to planning of multi-year, multi-resource programs to generate a networked program schedule for, for example, an event-based Integrated Master Plan/Integrated Master Schedule (IMP/IMS) approach, and more specifically to a web-based system and method for collaborative planning of a networked program schedule.

2. Description of the Related Art

Techniques for planning large multi-million dollar projects vary from industry-to-industry as well as within industries from project-to-project. Over the years, several planning approaches and strategies have been developed and implemented. The event-based Integrated Master Plan/Integrated Master Schedule (IMP/IMS) approach has emerged as a preferred technique for planning large Department of Defense (DOD) projects.

Event-based scheduling is a top-down technique based on planning towards major project events. The key framework for event based planning is described in the Integrated Master Plan (IMP). An IMP identifies the hierarchy and sequence of key events that function as contractual and management guideposts for the project. It is indentured to three hierarchical levels. These three levels are defined as the top level being an event, followed by a significant accomplishment, and ending with accomplishment criteria. This indentured listing becomes the backbone or framework for the entire program. A level zero is used for basic program and administrative definition. The Integrated Master Schedule (IMS) uses the framework of the IMP as its structure to define, sequence and link the detail tasks that must be performed to accomplish the goals of the program. The IMS is the detail schedule of the program.

The creation of a program IMP typically follows a process whereby key program Events are first defined and ordered at level 1 of the program. These Events are typically defined as major review points in the program that determine the readiness of the project to proceed to the next phase of the program. Some example events for a DOD project could be Contract Go Ahead, Requirements Review, Preliminary Design Complete, Critical Design Complete, Production Readiness Review, etc.

After program Events have been defined, Program Significant Accomplishments are defined for each Event. Program Significant Accomplishments should answer the question "in order to proceed into this Event, what should be accomplished?" Some example Significant Accomplishments for an Event such as "Requirements Review" would be Requirements Definition Completed, Requirements Documentation Complete, Requirements Flow-down Complete, etc. The Significant Accomplishments define level 2 of the IMP.

For each Significant Accomplishment Criteria must be defined in level 3 to complete the outline of the IMP. Criteria answer the question "What evidence do I have that this Significant Accomplishment has been achieved?" The Criteria are the artifacts or products that are necessary to meet the intent of the Significant Accomplishment. Some example "Criteria" for a Significant Accomplishment such as Requirements Documentation Complete would be Requirements Document Peer Review, Requirements Document Approval Signatures, Requirements Document Formal Release, etc.

Some program planning activities are performed by giving all the team leads (or program planners) a stack of 'stickies' and a pen. They are instructed to begin writing activities that need to be accomplished on the program on the sticky, than place the sticky on the wall in the general order of when the activity on the sticky will be performed. Sometimes programs will then string yarn from sticky-to-sticky to designate the order and linkage of the stickies (predecessor/successor). Once completed this "networked program schedule" is transferred from the stickies and yarn into a software planning tool such as Microsoft Project. Given the linked data MS Project generates the networked program schedule or IMS in the form of, for example, a Gantt Chart. In the instances where MS Project is used as the sole planning tool, the program team leads (or program planners) will sit in a room where the MS Project initial schedule (this initial schedule may have from 1 to 50 lines/tasks) is projected on the-wall and everyone in the room suggests new tasks to be placed in the schedule. A single program manager will enter and modify the program data as suggestions are made.

The sticky approach lacks integrity of task definition and links. Plus it's difficult to document. Often members will take a photograph of the wall and later attempt to key the data into a scheduling system like MS Project. The MS Project only approach is laborious and slow. One task is added at a time with the whole room sitting and watching the development of the schedule. In general these ad hoc techniques make it expensive to develop an IMP/IMS, can produce poor quality in the form of poorly managed, inadequate or unrealistic IMP/IMS. The planning process is highly variable, labor intensive and iterative.

SUMMARY OF THE INVENTION

The present invention provides an automated web-based system and application to manage the creation, sharing and validation of program schedule data collaboratively among multiple teams in a structured manner to generate a networked program schedule. The Integrated Planning Solution (IPS) application provides a structured approach to program planning that is time and cost efficient, produces well-managed, adequate and realistic schedules, is repeatable from project-to-project and can leverage information from previous projects. An embodiment of the IPS application focuses on the collaborative planning of the 'accomplishment criteria' for level 3 of an 'events-based' program. The IPS application does provide web-based capability to acquire the IPTs and tasks (program products, events and accomplishments) for levels 0-2 but this data could be provided by other means. The IPS application may also be extended to support the detailed intra-team planning of level 4 within each IPT. The IPS application may also be configured for use in other planning approaches.

In an embodiment of the invention, a web-based system for collaborative planning of a networked program schedule includes a central data storage server, a web application server, at least one administrative computer terminal, and a plurality of team computer terminals interconnected by a communications network such as a company Intranet and/or the Internet. An integrated planning solution (IPS) application on the web application server provides web-based forms to one of the administrative terminals for a program manager and/or chief engineer (responsible party) to specify tasks (e.g. program products, events and accomplishments) and define a plurality of integrated product teams (IPTs). The IPS application acquires data collaboratively from team leaders at the respective terminals by (a) providing an outputs form to the respective terminals listing the tasks for team leaders to specify supplier team outputs and their customers from among the IPTs or a final customer for the tasks, (b) once all of the outputs forms are completed, providing an inputs form to the respective terminals listing the supplier team outputs directed to the respective customer teams for the team leaders to accept or reject those outputs as customer team inputs, (c) once all of the inputs forms are received by the IPS, providing a linking form to the respective terminals that lists team inputs and outputs for the team leaders to link inputs to outputs for their respective teams, and (d) providing a duration form to the respective terminals listing the team outputs for the team leaders to assign durations and suitably resources to achieve the team outputs. The IPS application tailors the various forms to each IPT to acquire program data, shares program data among the IPTs as needed to complete the forms and validates the data for compliance, e.g. all tasks addressed, acceptance/rejection of team outputs, circular links, dangling inputs or outputs, etc. The IPS application forces team leaders to enter program data in parallel and in lock step from outputs to inputs to linking to finally durations and resources. The IPS application stores the program schedule data entered on the forms by the team leaders in the central data storage server. A program scheduling application accessible by at least one administrative computer terminal accesses the program schedule data stored on the central data storage server and generates the networked program schedule.

These and other features and advantages of the invention will be apparent to those skilled in the art from the following detailed description of preferred embodiments, taken together with the accompanying drawings, in which:

BRIEF DESCRIPTION OF THE DRAWINGS

Figure 4B:
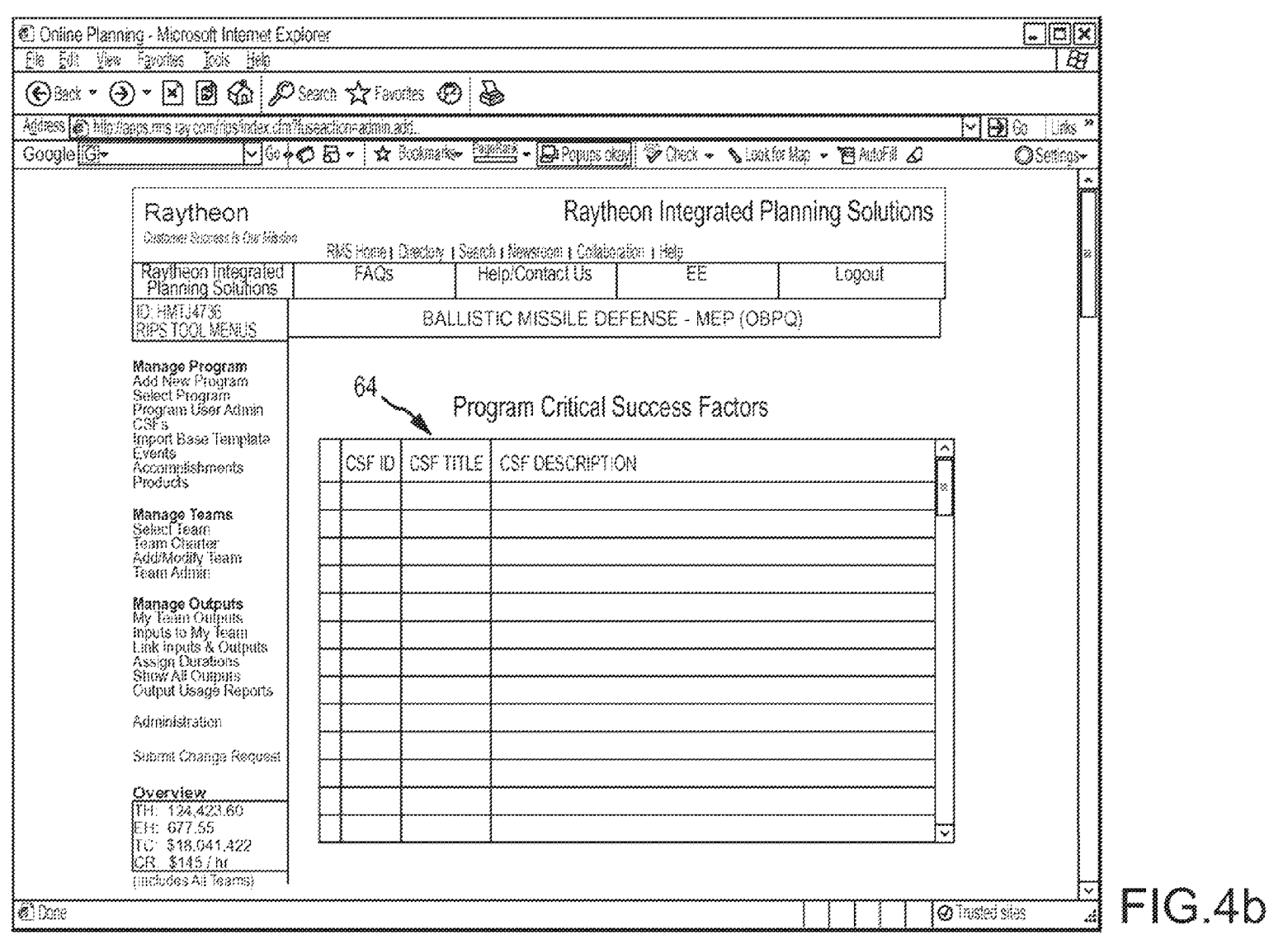
Figure 4D:
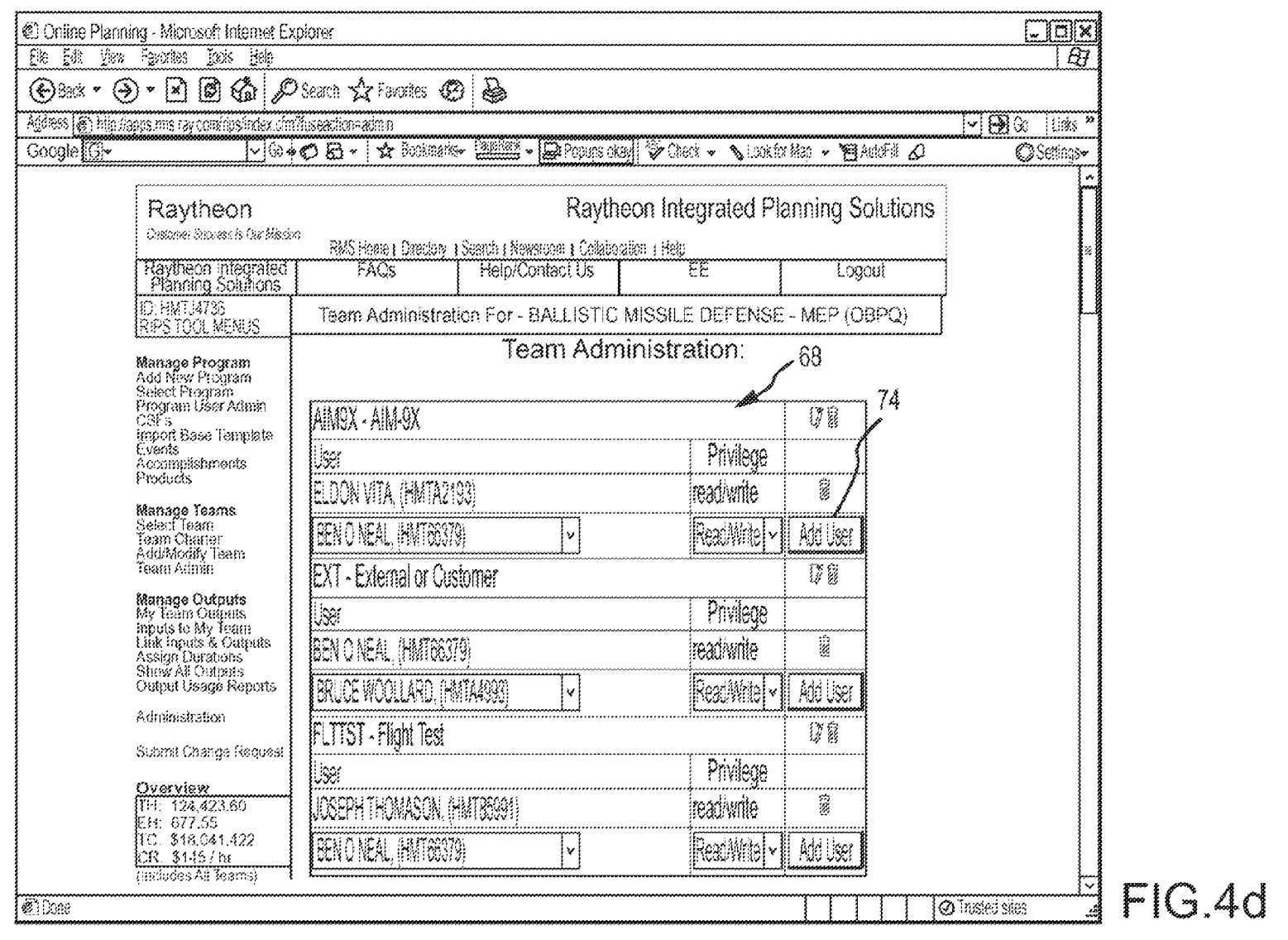

FIGS. 4a through 4d are web-based program forms for adding new programs, specifying CSFs, adding integrated product teams (IPTs) and defining team administration at level 0;

FIGS. 8a through 8c are web-based administrative overview forms providing visibility of the programs, IPTs, program products, events, and accomplishments entered in levels 0-2;

Figure 16:
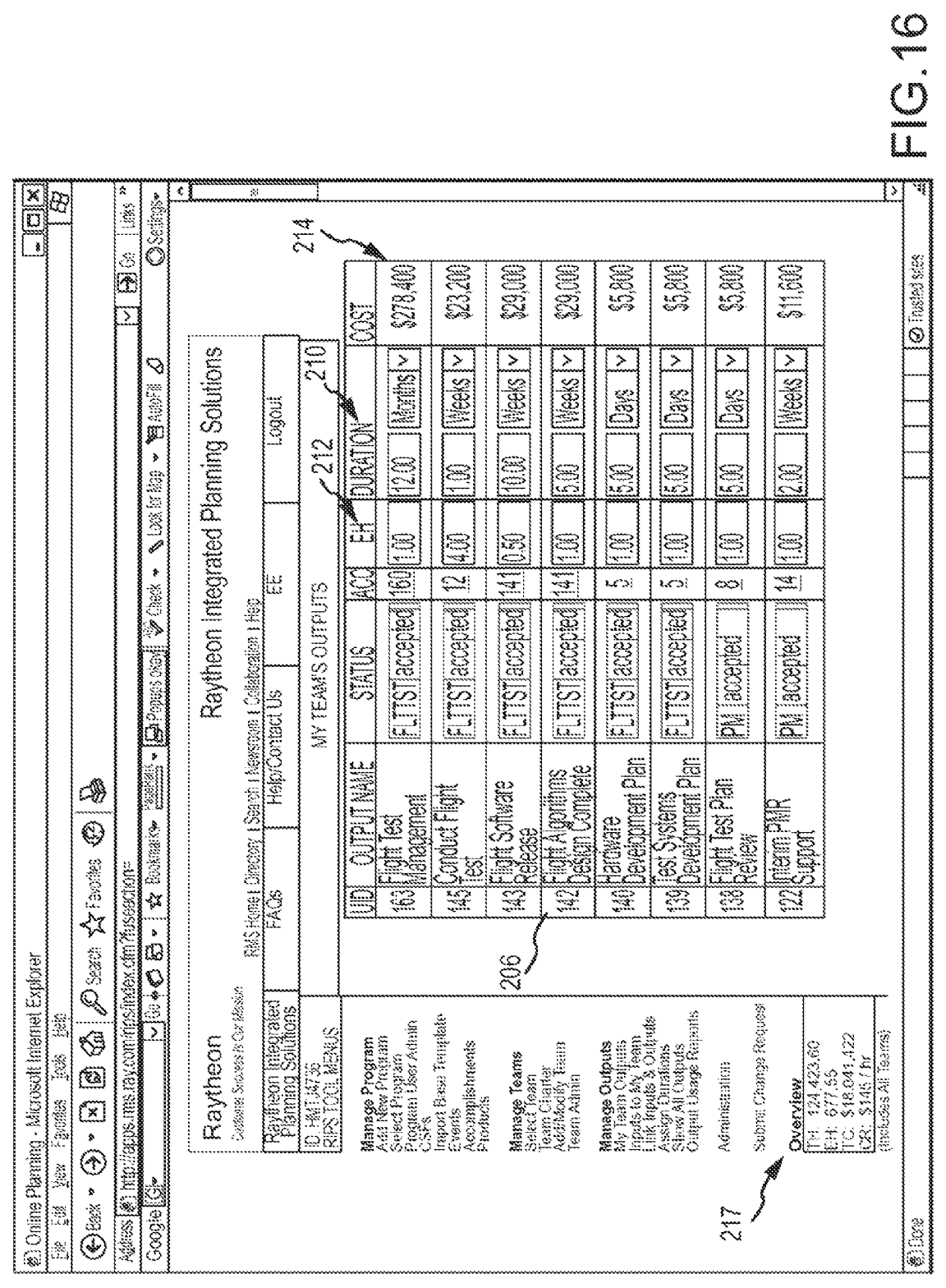

FIG. 16 is a web-based duration form for specifying durations and resources to accomplished linked outputs.

DETAILED DESCRIPTION OF THE INVENTION

The present invention provides an automated web-based system and method to manage the creation, sharing and validation of program schedule data collaboratively among multiple teams in a structured manner to generate a networked program schedule such as for an events-based IMP/IMS. The Integrated Planning Solution (IPS) application provides a structured approach to large events-based planning that is time and cost efficient, produces well-managed, adequate and realistic schedules, is repeatable from project-to-project and can leverage information from previous projects. The IPS application forces team leaders to enter program data in parallel and in lock step from outputs to inputs to linking to finally durations and resources. A focus of the described embodiment of the IPS application is collaborative planning of the 'accomplishment criteria' for level 3 in an events-based program. The described embodiment of IPS application does provide web-based capability to acquire the IPTs and tasks (program products, events and accomplishments) for levels 0-2 but this data could be provided by other means. The IPS application may also be extended to support the detailed intra-team planning of level 4. The IPS application may also be configured to support other planning approaches.

Figure 1:
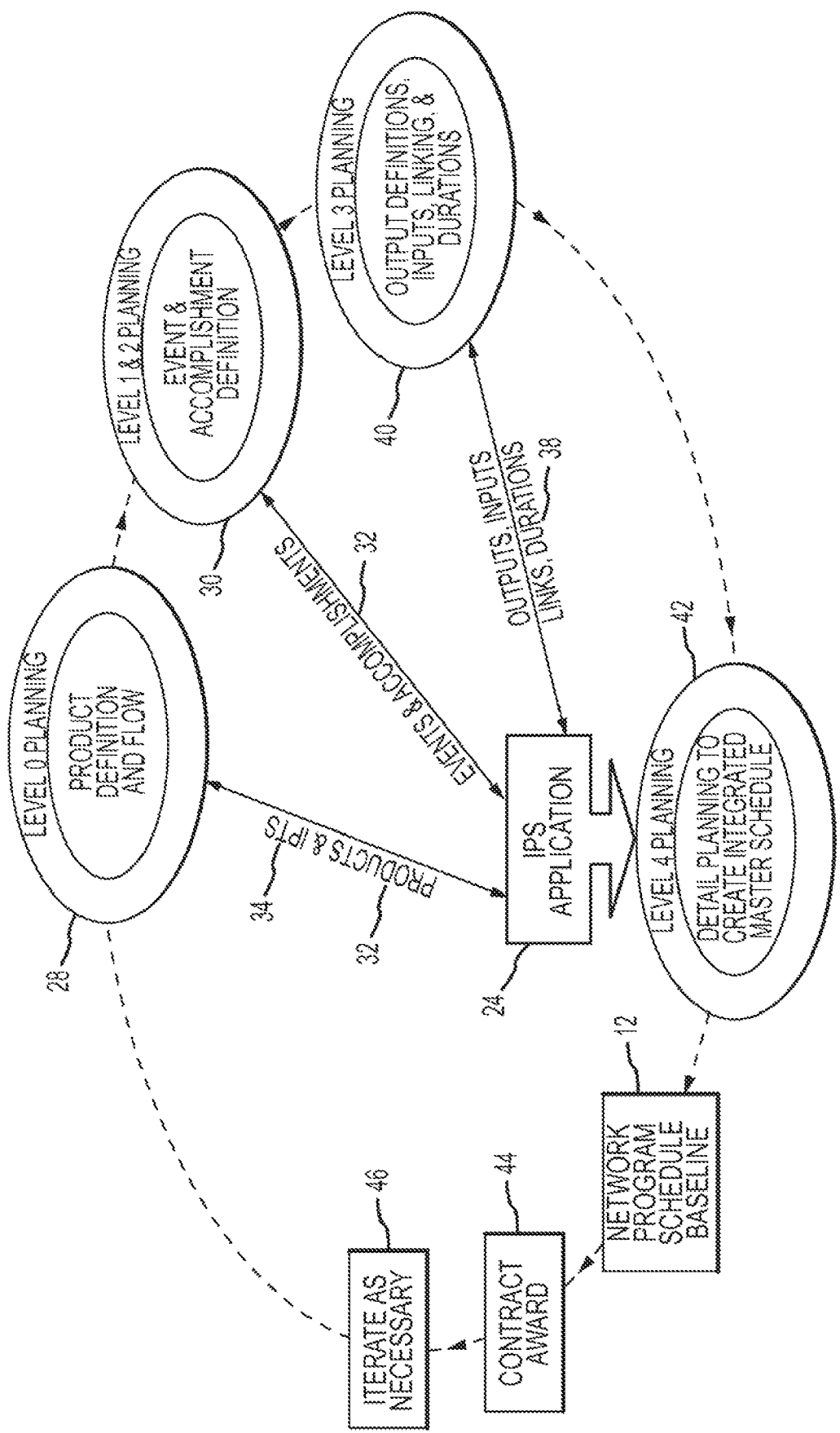
FIG. 1 is a diagram of the Integrated Planning Solution (IPS) application of the current invention integrated in structured program planning startup cycle to generate a networked program schedule.
Figure 2:
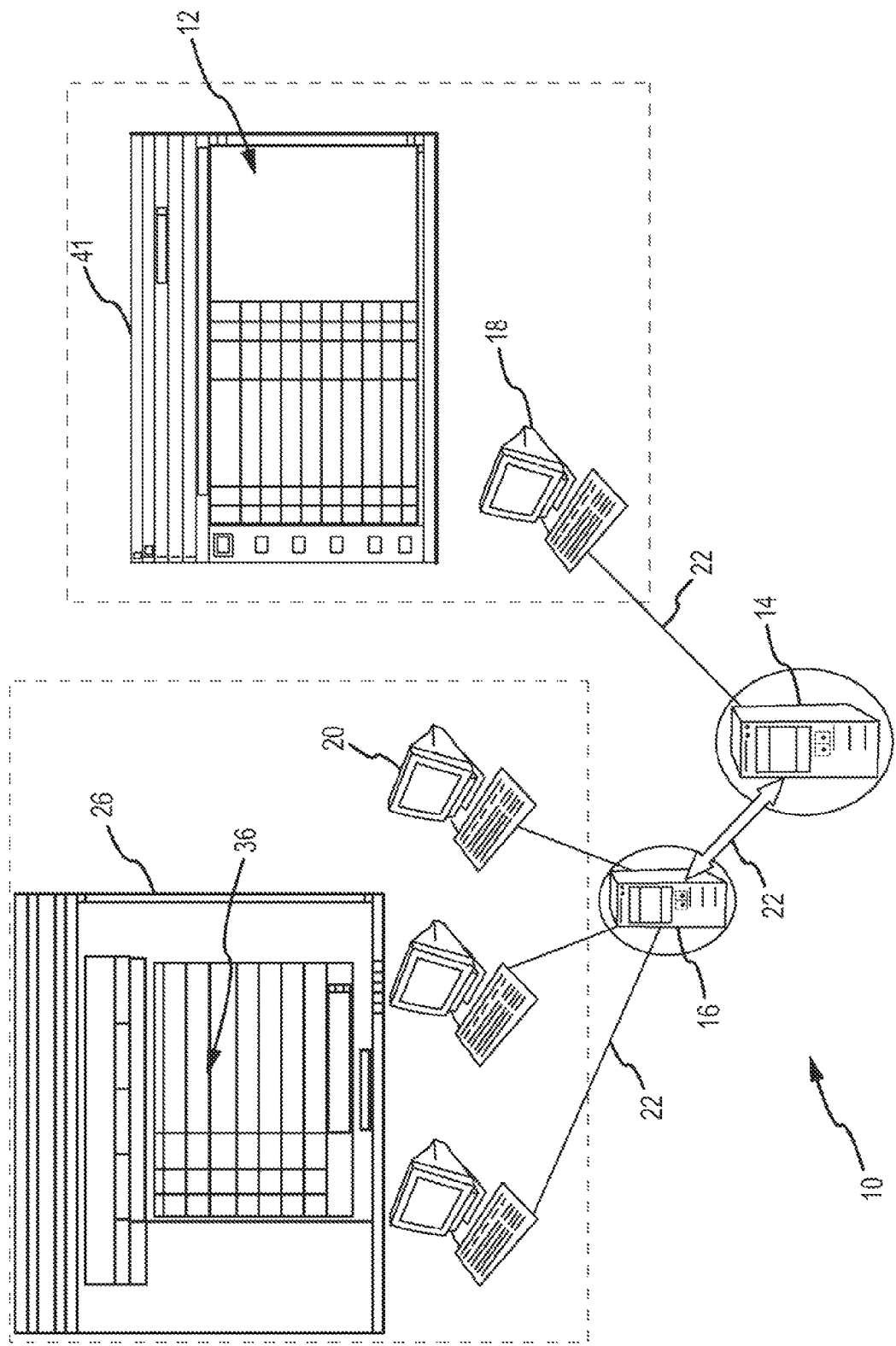
FIG. 2 is a diagram of a web-based architecture on which the IPS application is implemented.

As shown in FIGS. 1 and 2, a web-based system 10 for collaborative planning of a networked program schedule 12 includes a central data storage server 14, a web application server 16, at least one administrative computer terminal 18, and a plurality of team computer terminals 20 interconnected by a communications network 22 such as the Internet and/or a company Intranet. An integrated planning solution (IPS) application 24 on the web application server provides web-based forms 26 to acquire program schedule data. IPS application 24 may be provided to the server on a computer-readable medium encoded with instructions. At various steps in the planning process, the IPS application tailors the forms or the content of the forms to the particular IPT based on previously entered program data and/or that team's responsibilities. More specifically, in the level 0, 1 and 2 planning stages (steps 28 and 30) IPS application 24 provides forms to one of the administrative terminals for a program manager and/or chief engineer to specify tasks 32 (e.g. program products, events and accomplishments) and to define a plurality of integrated product teams (IPTs) 34. Although an integrated approach is preferred, the definition of tasks and IPTs may be performed by other means and provided as input to the IPS.

IPS application 24 acquires program schedule data 36 for level 3 accomplishment criteria 38 collaboratively from team leaders at the respective terminals 20 (step 40). IPS application 24 provides web-based forms 26 to the terminals for the team leaders to specify supplier team outputs including a customer team or final customer for the tasks, accept/reject supplier team outputs as customer team inputs, form team input-to-output links and specify output durations and stores the entered data in the data storage server 14. To effectively manage the collection of data, IPS application 24 tailors the forms to the respective IPTs, shares entered program schedule data among the teams to facilitate completion of the forms and validates or facilitates validation of the entered and linked program schedule data for compliance e.g. all tasks addressed, no circular links, no dangling inputs or outputs, etc. The IPS application saves program data suitably as it is entered to the central data base server. A program scheduling application such as Microsoft Project 41 accessible by at least one administrative computer terminal accesses the program schedule data 36 stored on the central data storage server and generates the networked program schedule 12. The program data is stored such that MS Project can create a program schedule at any time reflective of the planning status.

Level 4 planning involves the detailed intra-team planning necessary to create a full-blown Networked Program Schedule 12 (step 42). Each team will further refine their own plan and schedule to deliver their supplier team outputs. The available output at any planning level constitutes the networked program schedule 12, just with varying degree of detail. The IPS application may be extended to facilitate level 4 planning as well to provide an end-to-end integration planning solution. However, at present, level 4 planning is conducted within MS Project itself since inter-team collaboration is minimal. If a contract is awarded (step 44) based on the IMP/IMS, budget, etc., the IPS application can be used to iterate (step 46) as necessary to address any changes in program product definition, IPS, schedule, budget etc. Iteration maybe required prior to contract award as well.

Figure 3:
FIG. 3 is a table listing key steps of the IPS application and responsible parties at each level of the planning startup cycle.
Figure 4A:
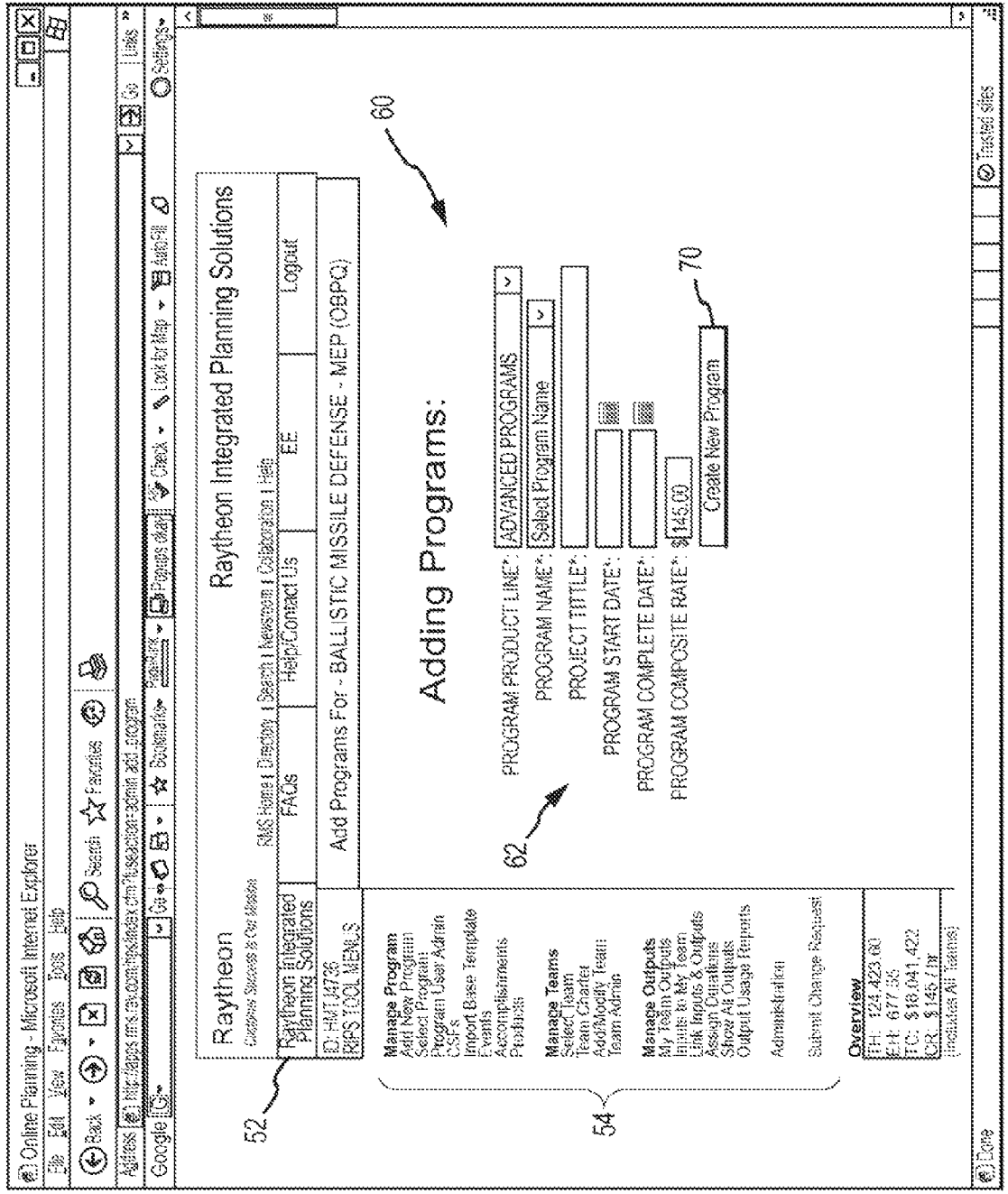
Figure 4C:
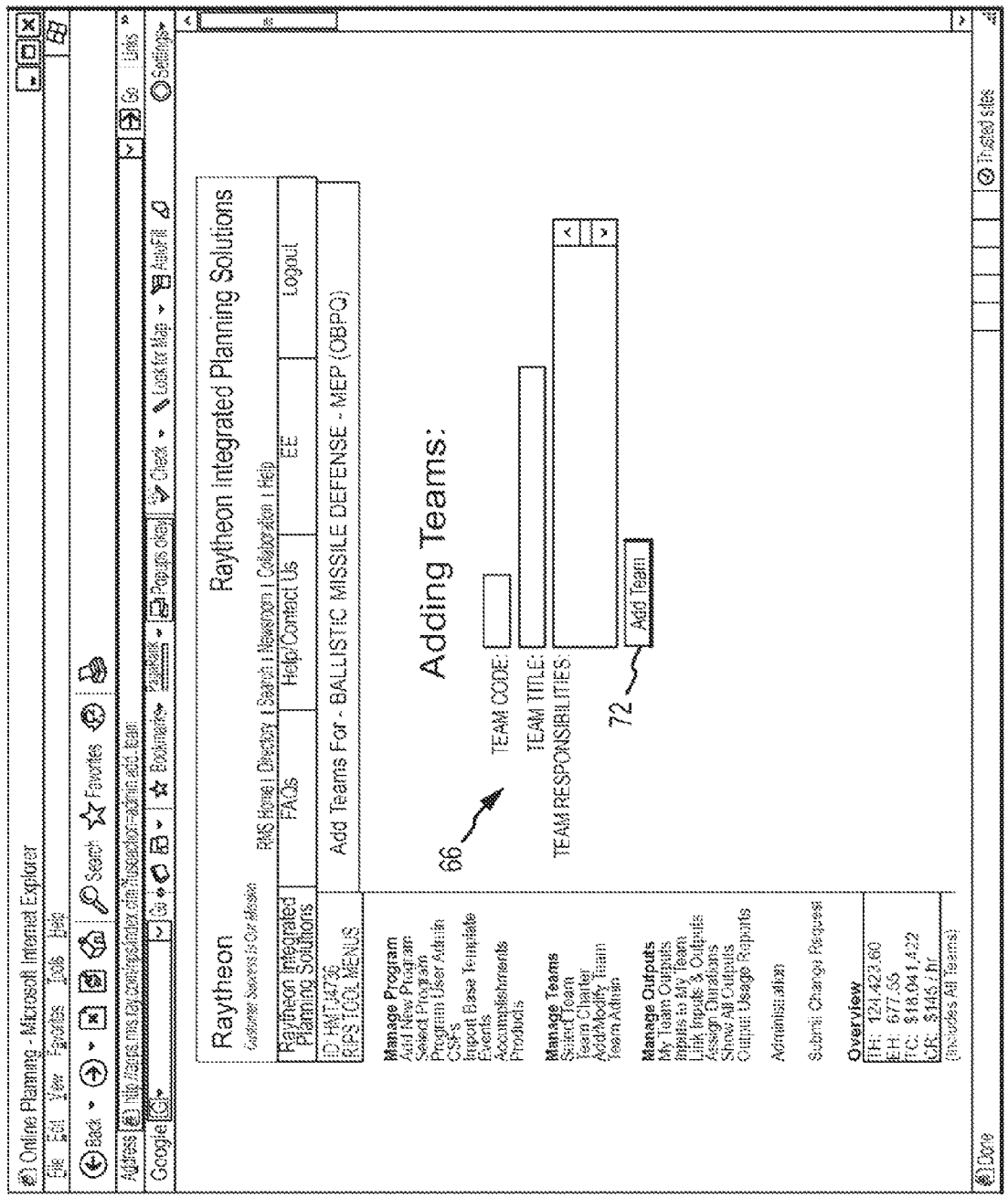
Figure 5:
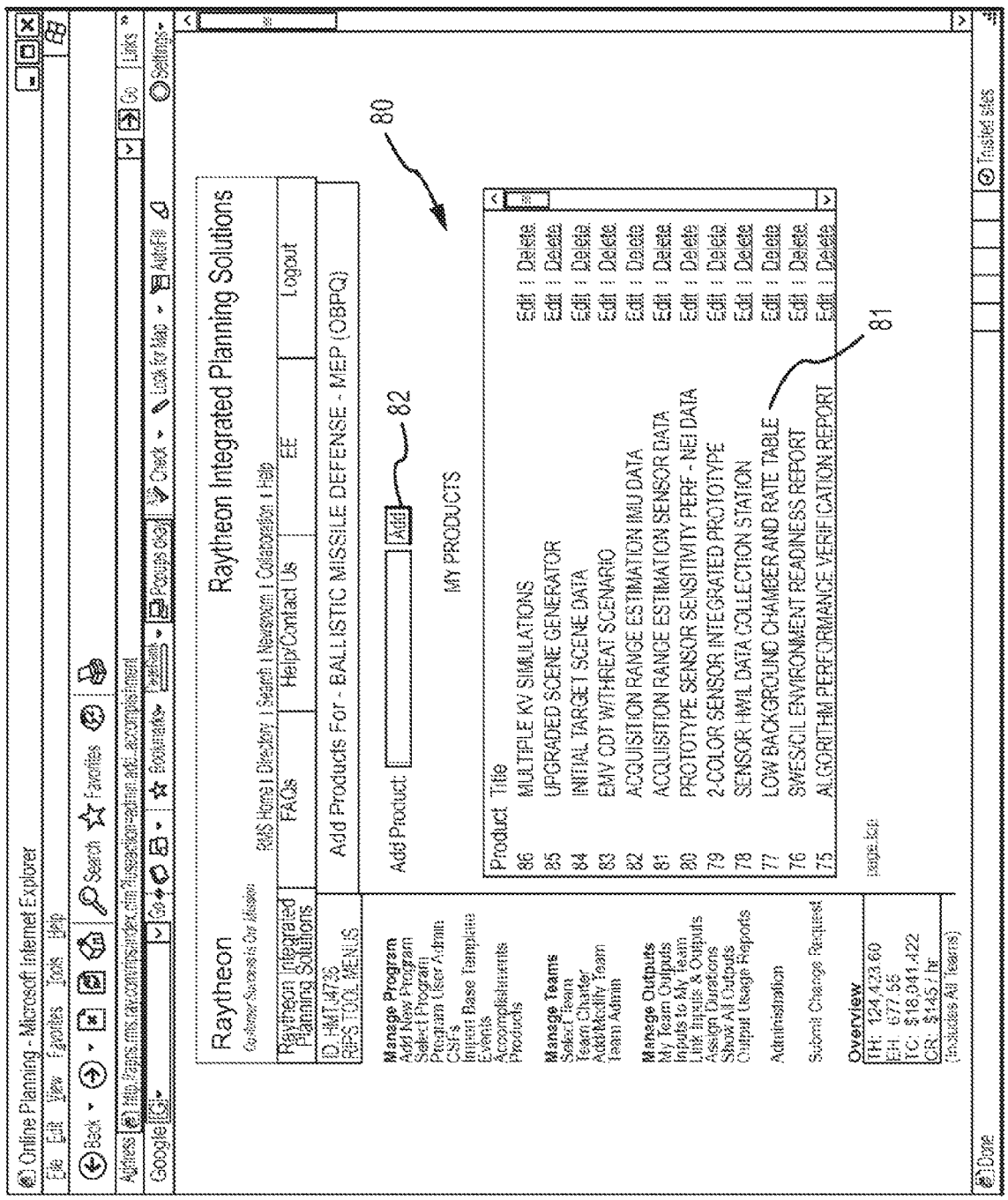
FIG. 5 is a web-based product form for adding program products at level 0.
Figure 6:
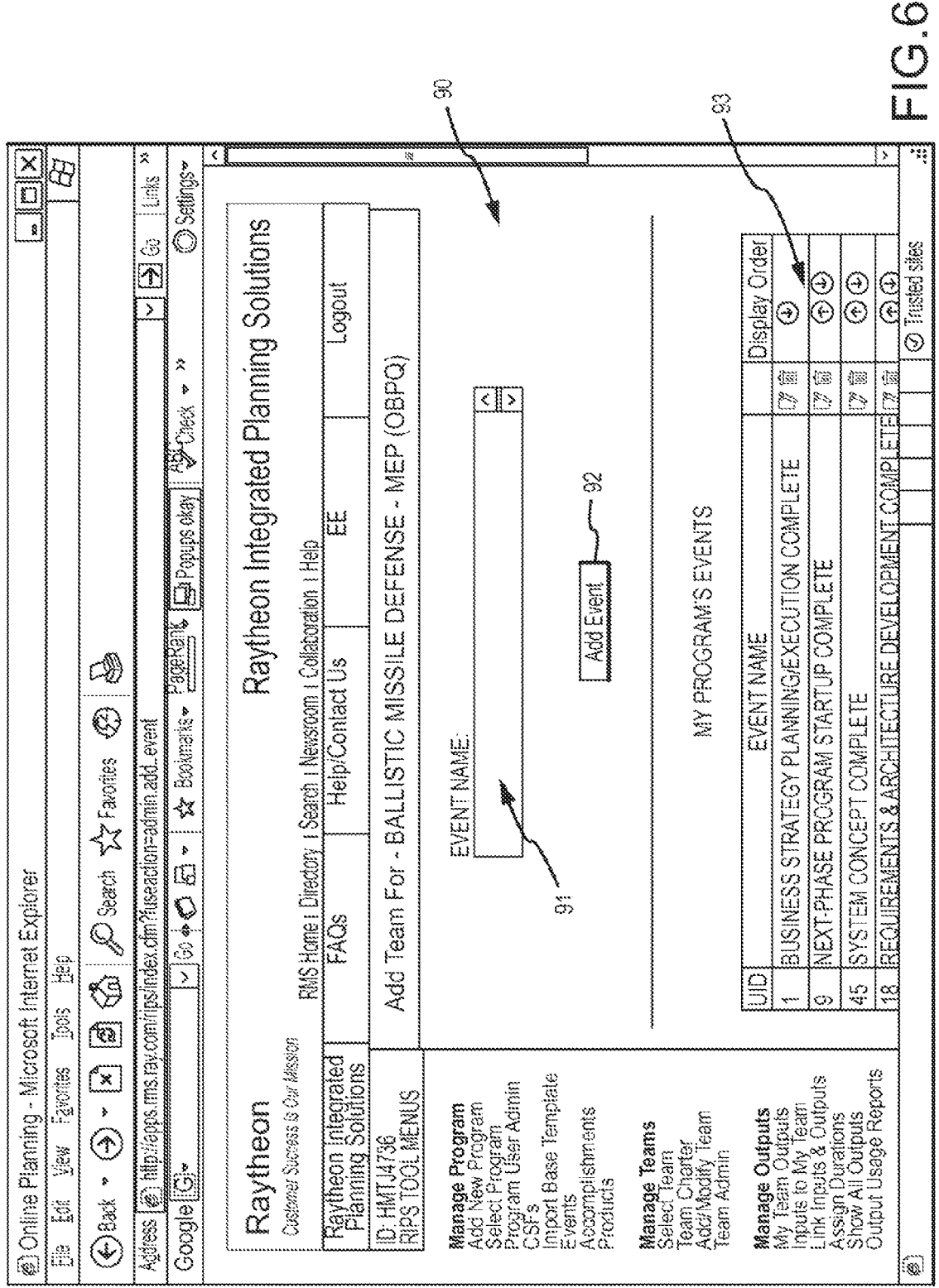
FIG. 6 is a web-based events form for adding events at level 1.
Figure 7:
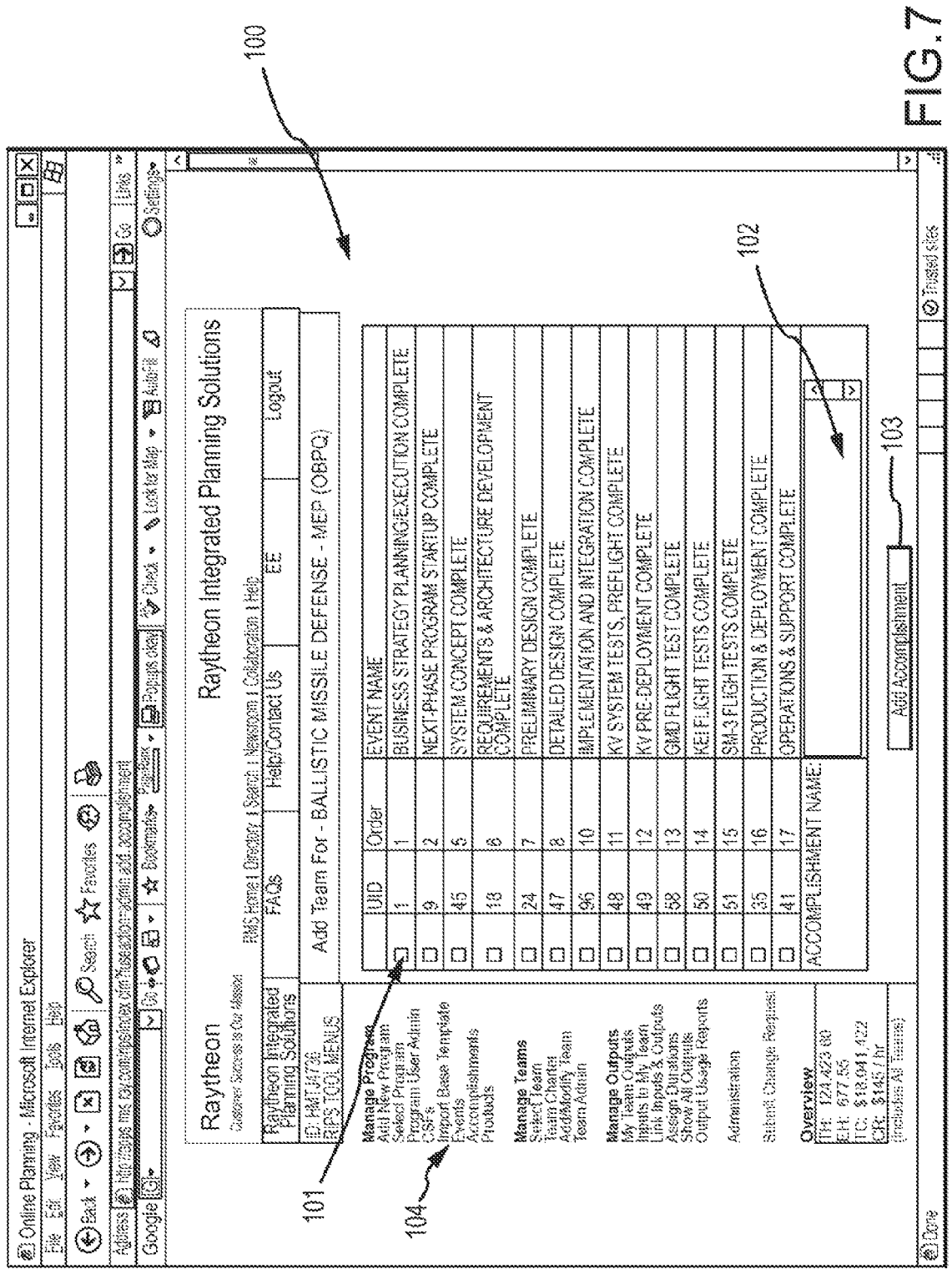
FIG. 7 is a web-based accomplishment form for adding significant accomplishments at level 2.

As illustrated in a program planning responsibility matrix 50 shown in FIG. 3, in a typical planning project a number of different people or functional positions contribute to the development of the networked program schedule at different levels of planning and with varying responsibility. In this particular example, a program manager, chief engineer, multiple IPT leads, a plan architect and one or more detail planners work together to create and refine the schedule. At planning levels 0-2, the program manager and chief engineer are the 'responsible party' with consulting and support from the PSX and detail planner. At planning level 3, responsibility shifts to the collaborative efforts of the IPT leads with support from the other parties. At planning level 4, the IPT leads and detail planner(s) have responsibility subject to approval from the program manager and chief engineer. On a given planning project, the participants and their level of participation may vary.

FIGS. 4-8 illustrate the use of the IPS application to support planning levels 0-2 to define the high-level tasks and IPTs for a given program. The IPS application suitably provides the different forms within a common template 52. The various planning functions 54 are listed on the left side of the template. If enabled by the IPS application (or a facilitator), the user can 'click' on a particular function in the planning process and be provided with the corresponding forms. In this example, the functionality is broken out under Manage Program, Manage Teams and Manage Outputs. An Overview keeps a running total of scheduled hours and cost. Instead of allowing or requiring a user to click on a function, the IPS application may 'push' (or allow a facilitator to push) the forms to the users at the appropriate times.

For level 0, the CE/PM clicks "Add New Program" and the IPS application provides an "Add New Program" form 60 that allows the Chief Engineer (CE) and/or Program Manager (PM) to add a program 62. The responsible party adds a program by, for example, selecting the product line and program name and specifying a project title, start and completion dates and a composite hourly labor rate and than clicking the "create new program" button 70. To specify a critical success factors (CSF), the CE/PM clicks on "CSFs" and enters the CSF 64. The critical success factors, which are optional, are high-level factors that can be evaluated to assess the overall success of the program. To add an IPT 66, the responsible party clicks on "Add/Modify Team" and enters a team code, title and responsibilities and clicks a "add team" button 72 and clicks on "Team Admin" to define the administration and composition of the IPTs 68. To define IPT membership, the responsible party selects the team, selects a team member, assigns read/write privilege of program data via the IPS application and clicks an "add user" button 74.

Once the "Add New Program" form is complete, the user clicks on "Products" and the IPS application will provide an "Add Products" form 80 to the CE and PM to define the products 81 generated by the program. The "program products" may be internal products that are key to successful accomplishment of the program or they may be specific products deliverable to a final customer. The CE/PM type in a product name and click the 'add' button 82. The application assigns a product number and lists all of the defined products. The CE/PM can edit or delete products from the list. The definition of Program Products is not part of a standard level 0 IMP/IMS planning procedure but is a useful but not necessary feature of the IPS application. The addition of Program Products, although optional, forces an alignment of team leaders as to the program goals, objectives and deliverables.

Once the program products have been defined, the CE/PM clicks "Events" and the IPS application provides an "Events" form 90 that prompts the user to enter an event name 91 and click the "add event" button 92. The IPS application assigns each event a Unique Identifier (UID) and displays them in sequential order. The "display order" arrows 93 allow the user to move an event up or down in the sequence. The application also allows the user to modify or delete the events. Once the events have been defined, the CE/PM clicks "Accomplishments" and the IPS application provides an "Accomplishments" form 100 that lists all of the events and prompts the user to select an event by checking a box 101 to the left of the event, entering an accomplishment name 102 and clicking an "add accomplishment" button 103. Typically, each event will have one or more accomplishments and each accomplishment will be typically although not necessarily assigned to only one event. The IPS application may provide and the user may elect to click on "Import Base Template" 104 that provides a predefined list of Events and their Accomplishments. The Base Template is generated based on knowledge acquired from past programs and reflects a desire and capability to standardize program planning thereby improving the quality of the end product and the efficiency of developing the schedule. The user can delete, edit or add to the Base Template as desired to address the specifics of the current program.

The IPS application suitably manages the entry of program data in a sequential manner as described. For example, the IPS application may enforce completion of the Add New Program form before providing access to the Add Products form and so forth. When the current form is completed, the IPS application can either "push" the next form to the CE/PM to prompt data entry or simply allow them to access the next form via the proper link. Alternately, the application could allow the CE/PM to access the forms as desired. As mentioned previously, although the IPS application is configured to gather the task and IPT information, this high-level information could be acquired using a different method and input to the IPS application to address the level 3 planning.

Figure 8B:
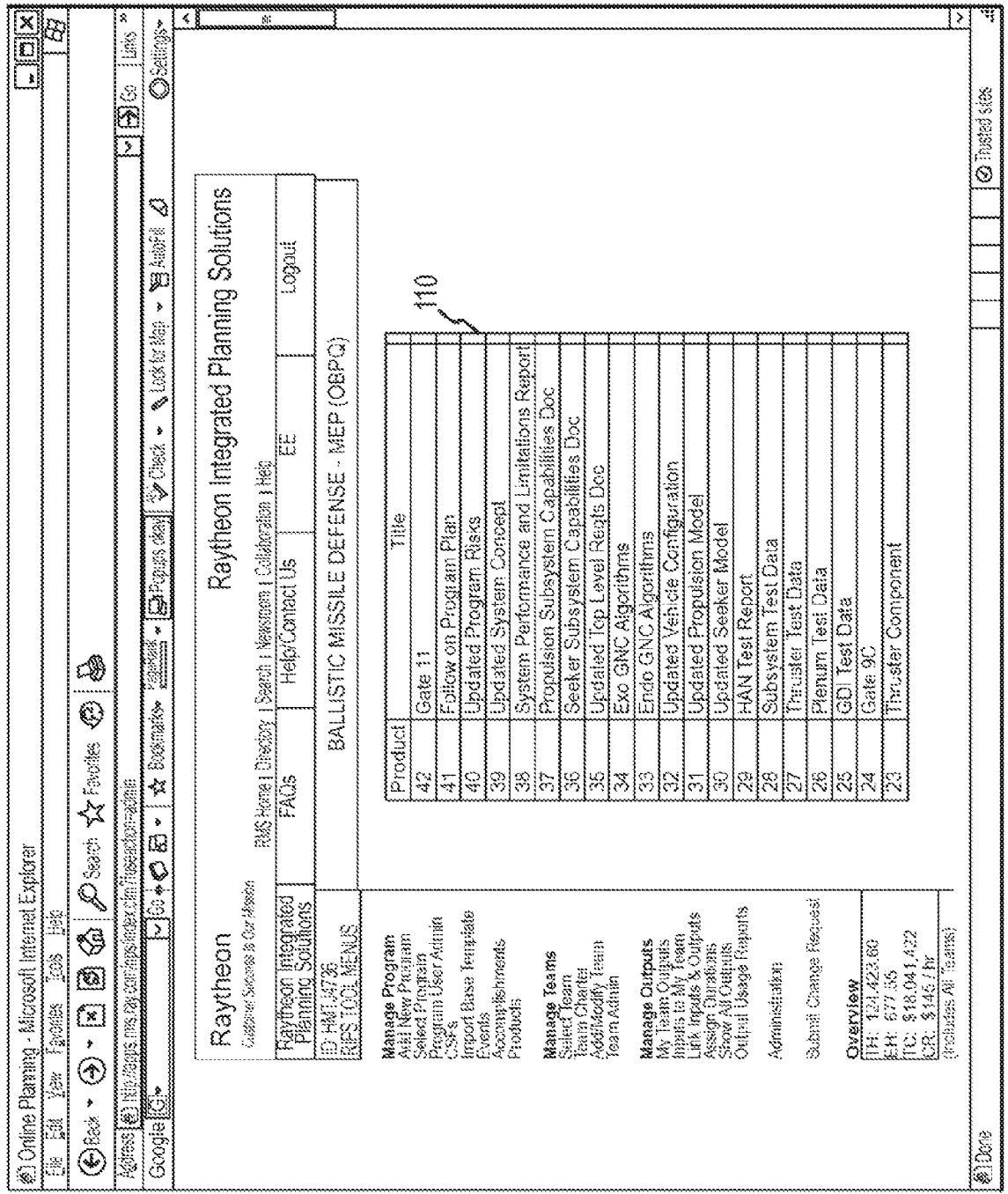
Figure 8C:
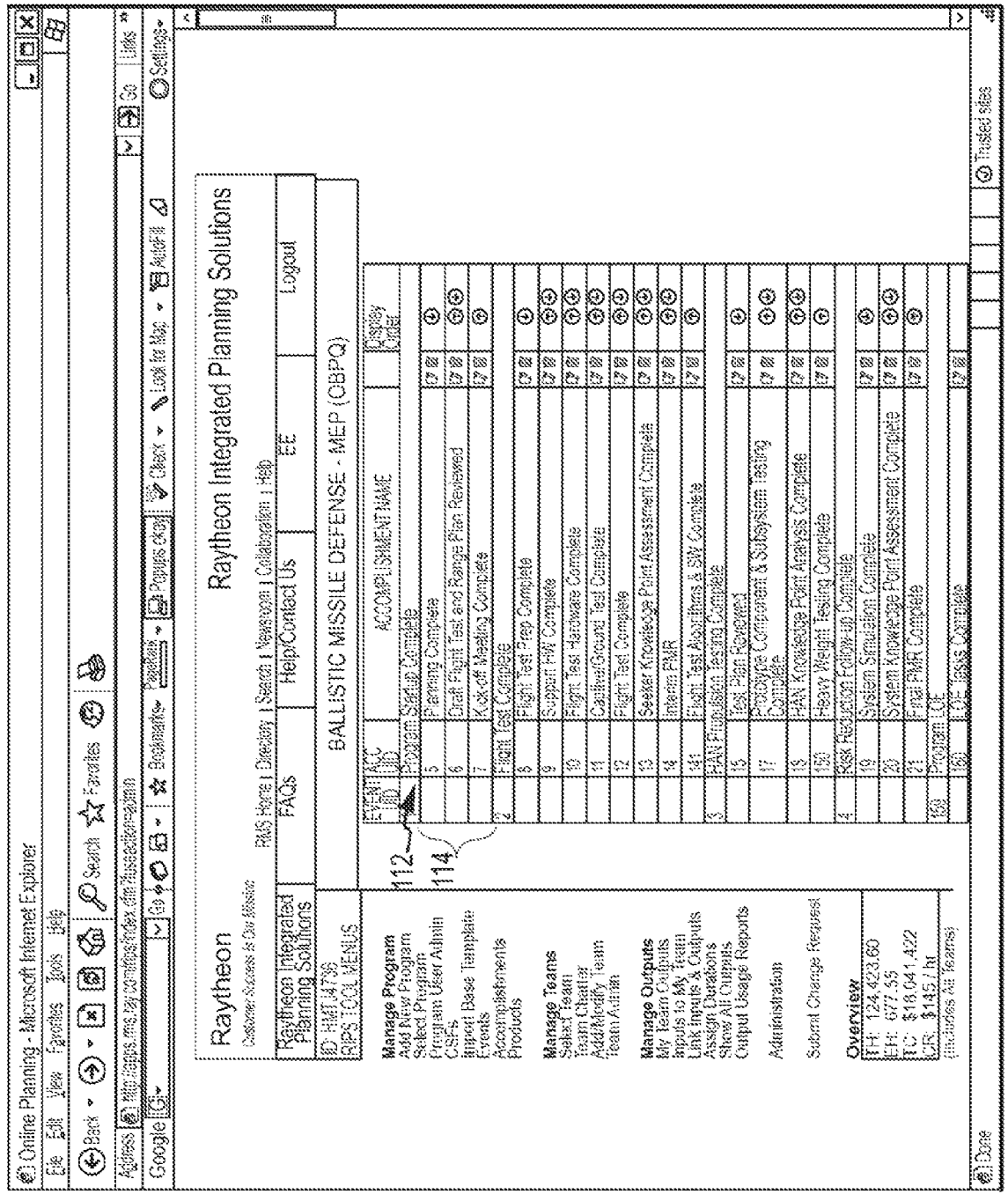
Figure 9:
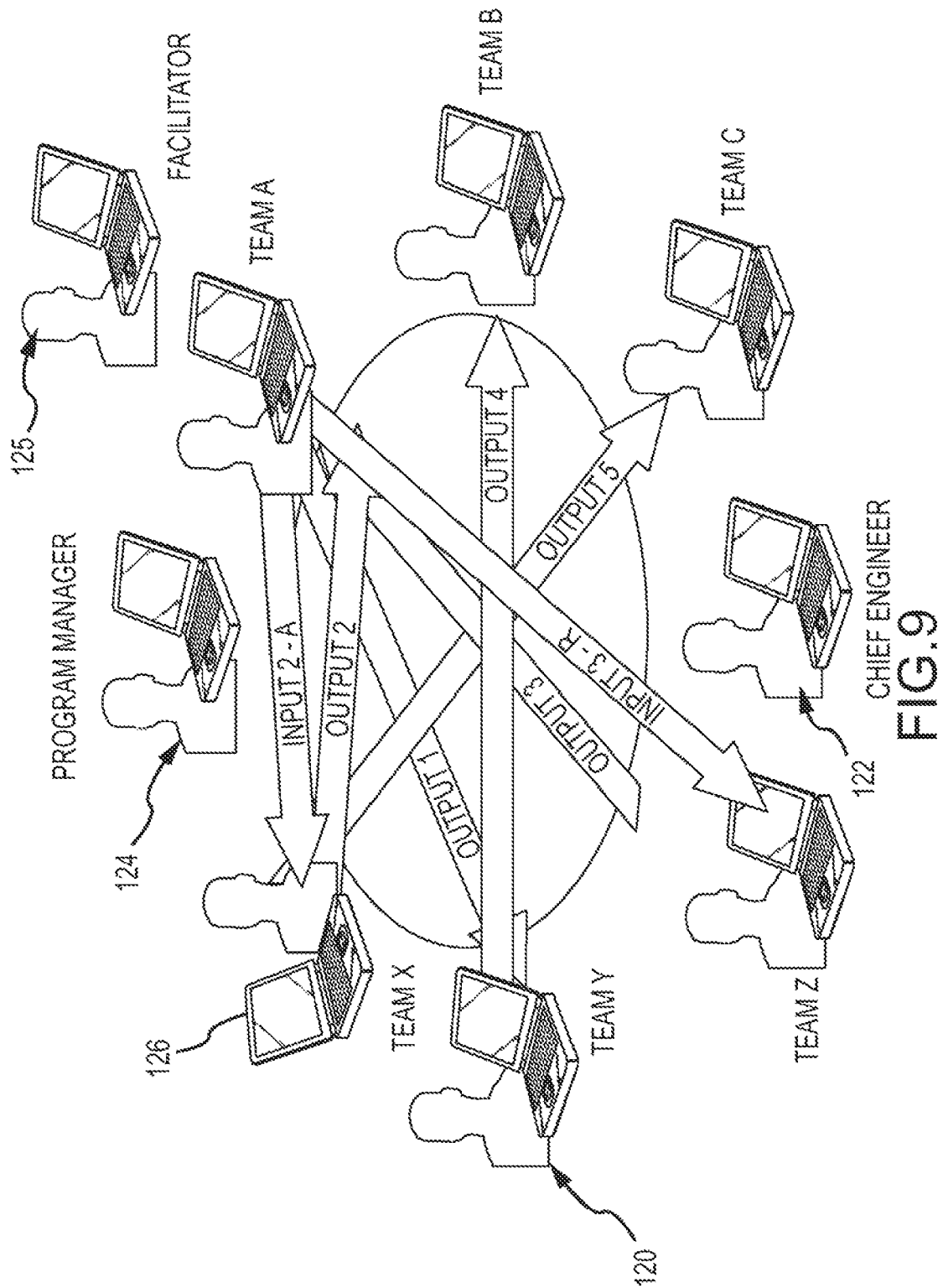
FIG. 9 is a diagram illustrating the use of the IPS application to collaboratively create, share and manage program data among the IPTs in level 3 to generate the network program schedule.
Figure 10A:
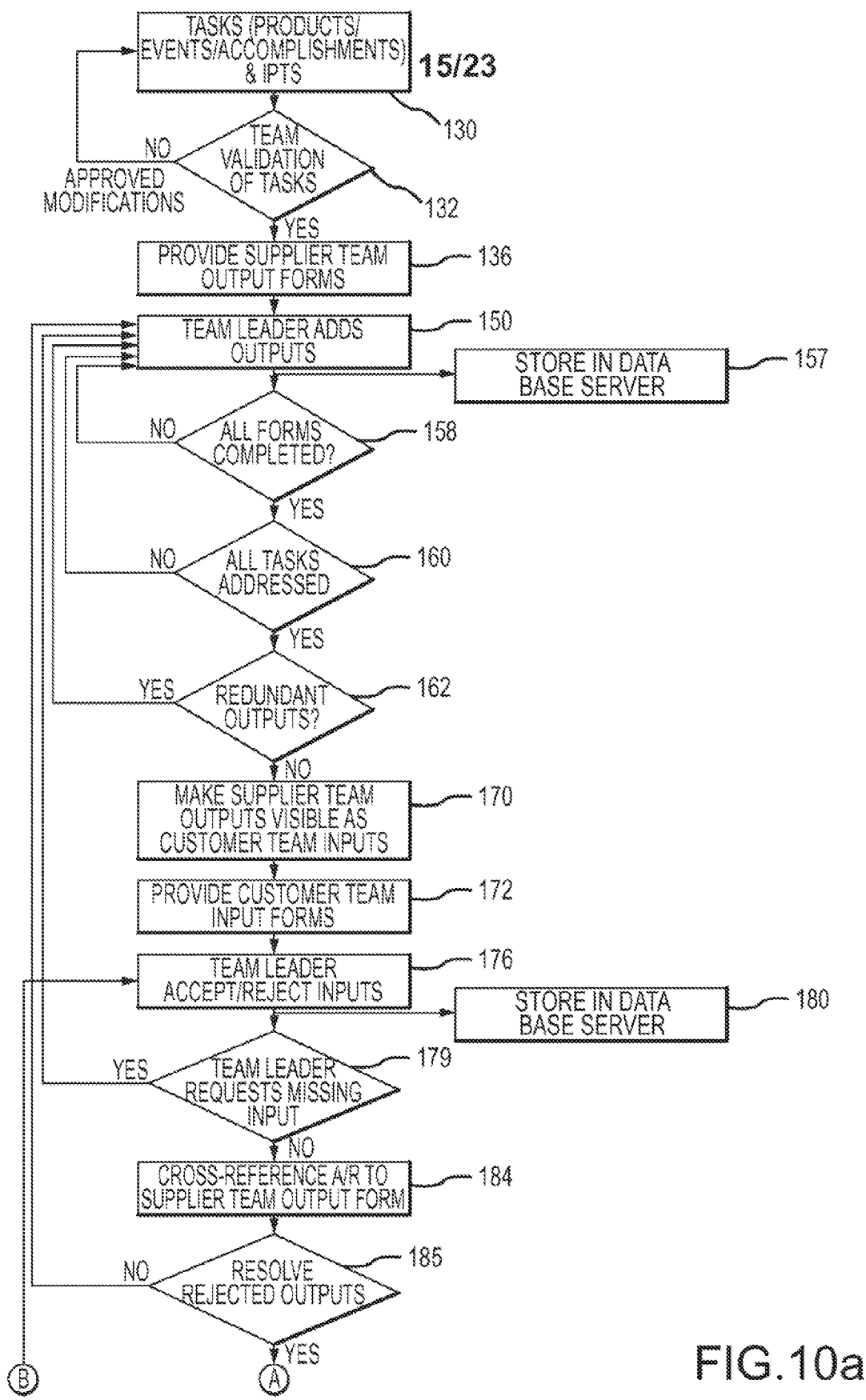
FIGS. 10a and 10b are a flowchart of the level 3 collaborative planning process executed by the IPS application to initiate the creation of program data, provide visibility and sharing of data among teams and manage the integration of program data to generate the networked program schedule.
Figure 10B:
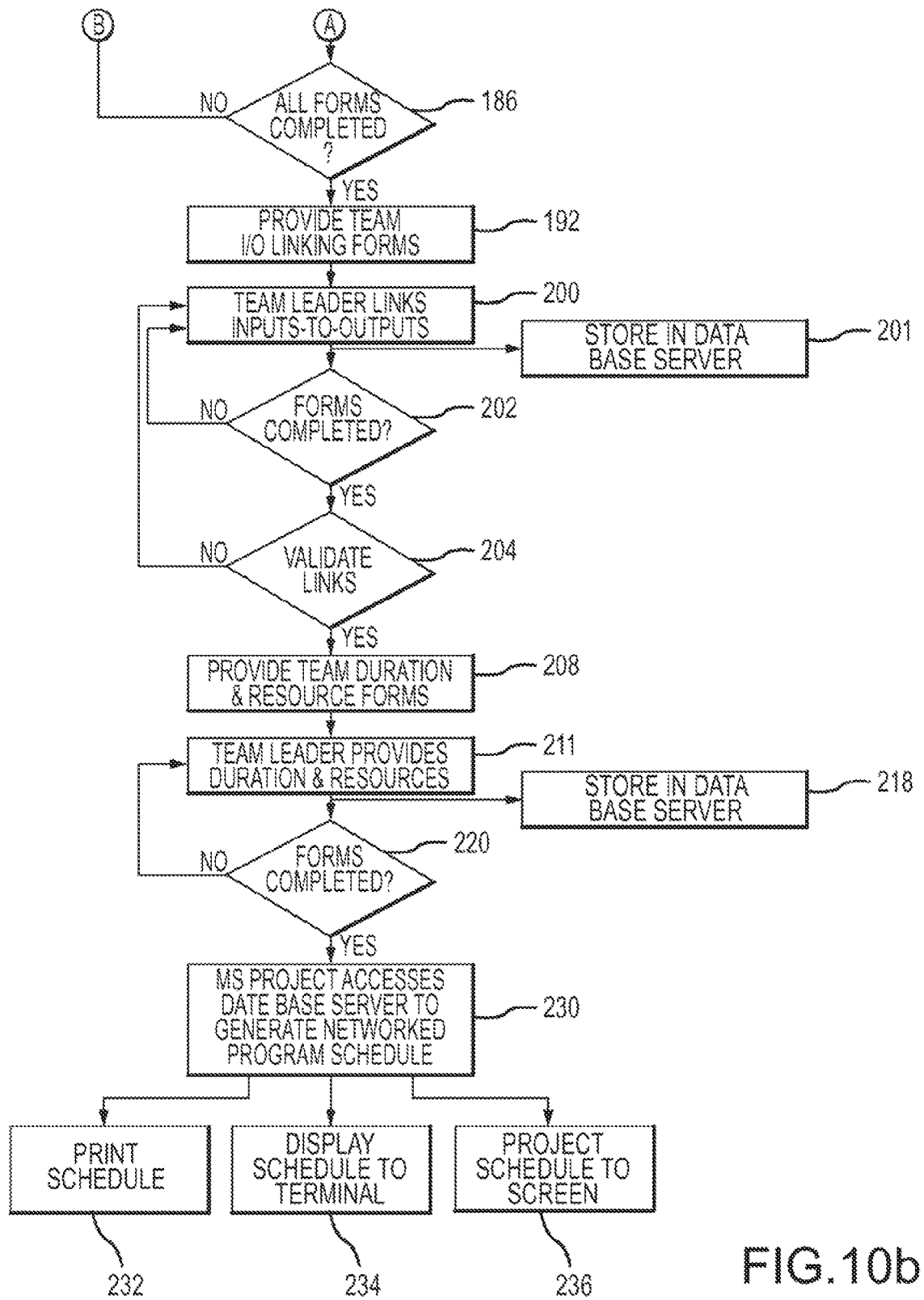
Figure 11:
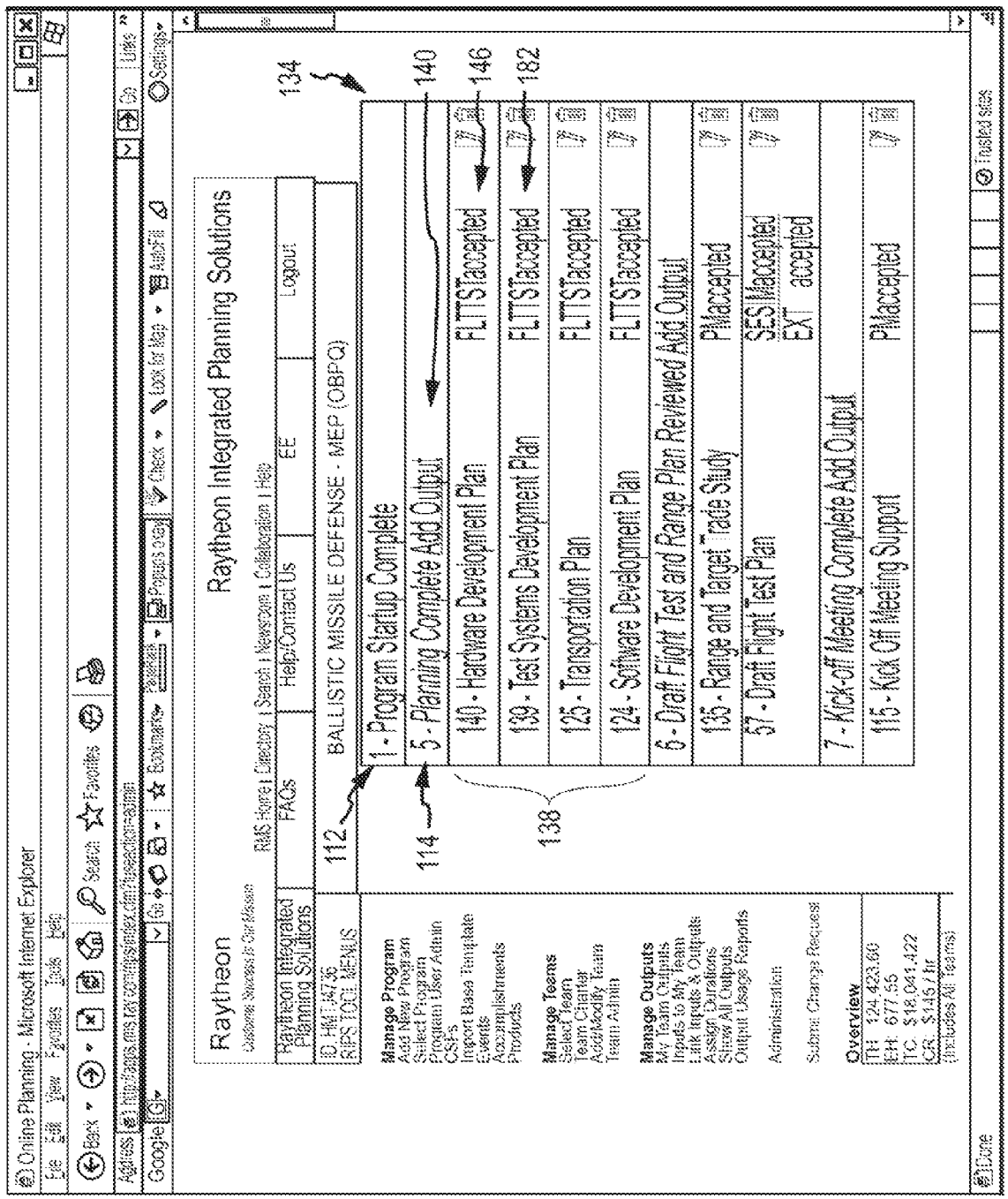
FIG. 11 is a web-based tasks form providing visibility of an IPT' outputs organized by event and accomplishment.
Figure 12:
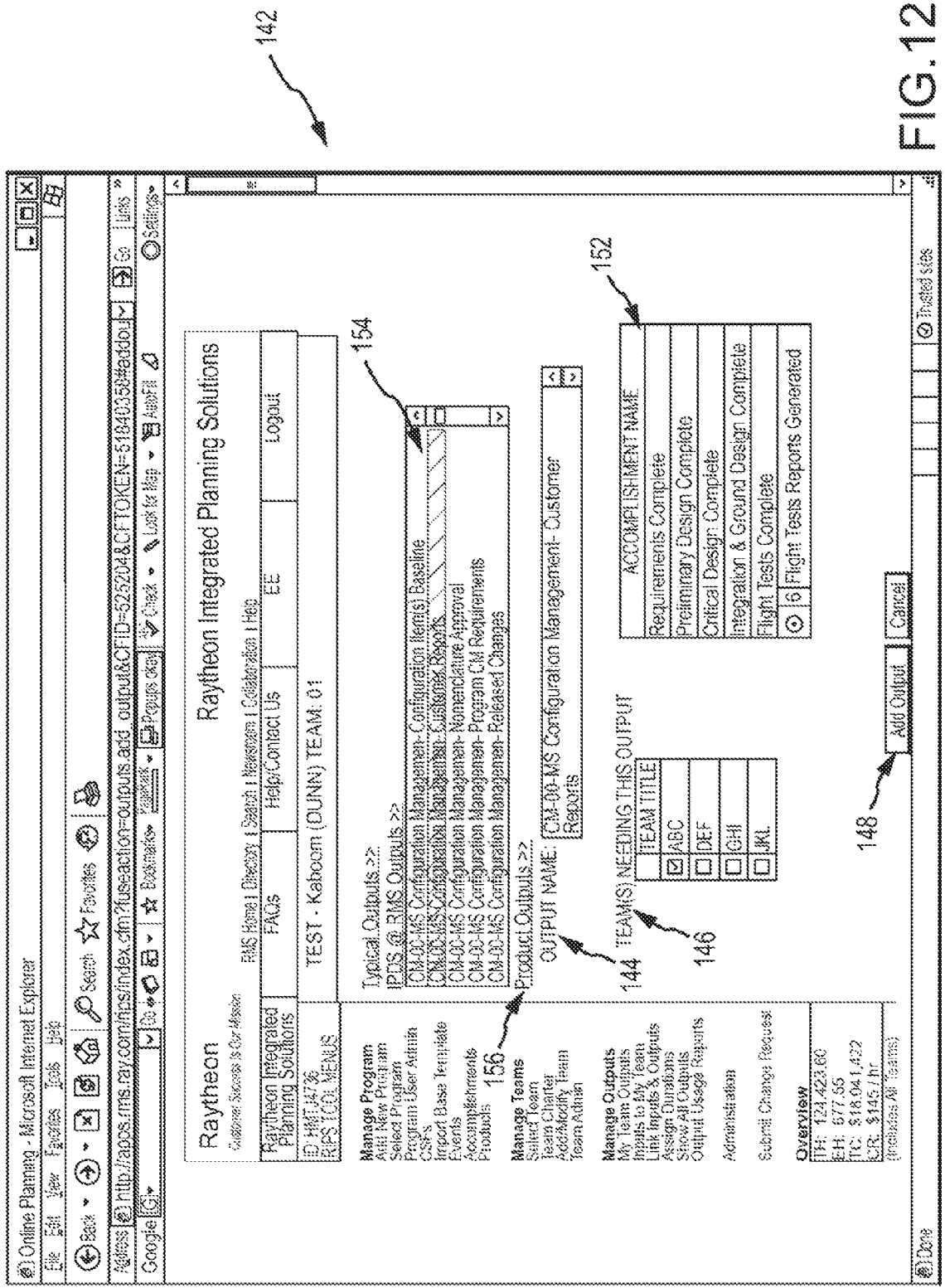
FIG. 12 is a web-based outputs form for adding team outputs and specifying the output customer for a given accomplishment.
Figure 13:
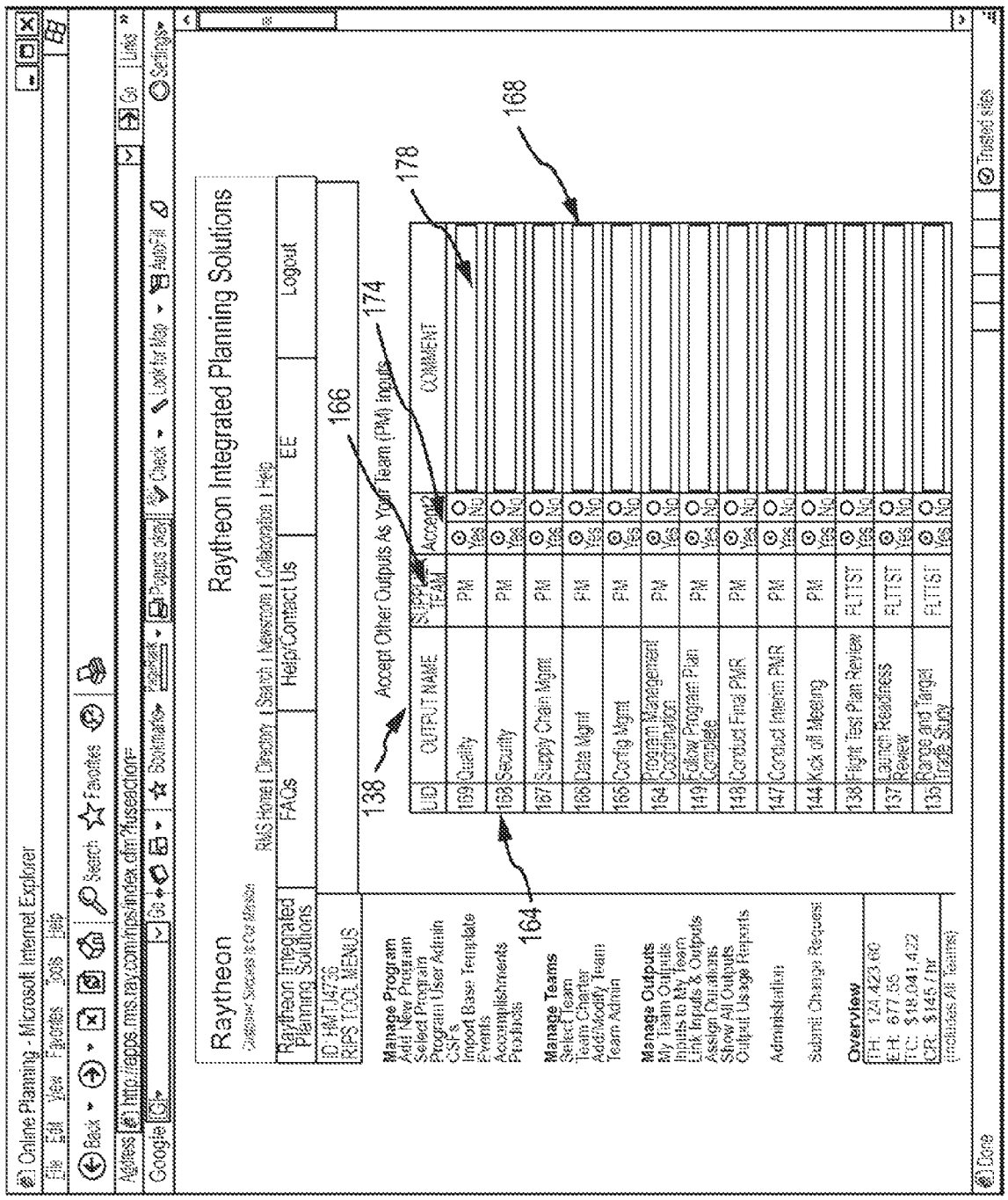
FIG. 13 is a web-based inputs form for accepting or rejecting and commenting on team outputs made visible as outputs to a particular IPT.

Once all of the high-level information for levels 0-2 has been entered by the CE and PM, the IPS application rolls up the information to present the tasks 32: products 110, events 112 and accomplishments 114 and IPTs 34, in a Program Overview screen(s) 116a-116 as shown in FIGS. 8a-8c. This screen is not essential to acquire the program data to build the networked program schedule but is useful to the CE, PM and IPT team leaders to provide an overview of the high-level inputs.

FIGS. 9-16 illustrate the use of the IPS application to support the collaborative planning among the IPT team leaders in planning level 3 to provide the "accomplishment criteria". The IPS application forces team leaders to enter program data in parallel and in lock step from outputs to inputs to linking to finally durations and resources. The IPS application tailors the forms or, more specifically, the program data therein, to the specific IPT and shares or "makes visible" program data between the teams as needed to complete the forms. The IPS application also monitors the entered data to ensure or, at a minimum, prompt compliance with various requirements, e.g. all program products and accomplishments must be addressed, no circular links, and no unlinked inputs or outputs. Level 3 planning requires considerable collaboration among the IPT team leaders. The IPS application facilitates and, in some cases, enforces this collaboration. The IPS application may be used with the aid of a human 'facilitator', perhaps the program manager, who guides the team leaders through the planning process.

In a typical planning scenario, IPT team leaders 120, chief engineer 122, program manager 124 and possibly a facilitator 125 will meet to perform the collaborative phase of the planning process. Unlike the traditional "stickies" or MS Project approaches, each participant will have his or her own laptop computer 126 having access to the IPS application on the web application server via the Internet and/or company Intranet. At least one or the participants will have access to a program scheduling application, on his/her laptop or on a server, to access the program schedule data stored on the central data storage server and generate a networked program schedule at any point during the planning process, which may be displayed on the participants' laptops and/or projected onto a screen. Unlike the "sticky" or MS project only approaches, the use of the IPS application supports concurrent and collaborative entry of program data among the multiple IPTs. The IPS application manages the provision of forms, sharing of data and validation of data entry automatically to facilitate level 3 planning. Individual participants may be physically or virtually present as all information is shared via the web-based application. The IPS application can 'provide' forms either by pushing (or allowing the facilitator to push) the form to the team leaders at the appropriate time, or allowing the team leaders to request the form by clicking on a button provided any preconditions have been met as determined by the application itself or the facilitator. The presence of the facilitator is not required but may make the planning process run more smoothly, particularly if the other participants are not familiar with the IPS application. The facilitator may take a relatively passive role; simply explaining the process, making sure the system is up and running etc. or the facilitator may guide the process through acquisition of inputs, outputs, linking and duration and resources, in which case the facilitator may interact with the IPS application to control when the next forms were provided and possibly to validate entered program data.

In an exemplary embodiment, the IPS application receives the defined tasks and IPTs (step 130) and facilitates validation by the IPT team leaders (step 132). Validation is optional and may simply constitute displaying Program Overview screen 116 and getting a voice agreement from the team leaders. Alternately, the IPS application may require each team leader to 'sign off' electronically on the high-level tasks and IPT definitions by, for example, clicking a "validation" function to display the tasks and than an "accept" button. Typically, only the CE or PM would be allowed to change the task or IPT definitions.

The team leader clicks on "My Team Outputs" and the IPS application on the web application server will than provide a Supplier Team Output Form 134 over the communication network to each team leader's laptop computer 126 (step 136). The Output Form is suitably organized hierarchically by listing each Event 112, each Accomplishment 114 under the corresponding Event and each Output 138 (initially blank) that supports each Accomplishment 114. For each Accomplishment that his/her IPT supports, the team leader clicks the "add output" button 140, which causes the IPS application to deliver an "add outputs" form 142. At a minimum, this form prompts the user to enter an "output name" 144, select a customer team 146 that the team leader identifies as needing this output (customer may be his own team, another team or a final customer of a deliverable program product), and click the "add output" button 148 (step 150). The team leader may be required to verify the accomplishment this output supports or may be allowed to cross-reference this output to other accomplishments 152.

The Add Outputs form 142 provided by the IPS application may be blank, e.g., no specified outputs, or it may include a list of default outputs 154. The default outputs are defined offline based on knowledge gathered from previous programs and stored in the central data server. The lists of default outputs are suitably cross-referenced to both the Accomplishment (and possibly the Event it supports) and each IPT as typically different product teams will be responsible for supplying different outputs. Consequently, the list of defaults provided to each IPT team leader is tailored to his/her team and the Accomplishment to be addressed. In addition the Program Products 110 specified in level 0, may be listed as Product Outputs 156 from which the team leader can select. As part of its management function, the IPS application will check to see that all tasks, e.g. program products and accomplishments have been addressed, so providing this lists helps facilitate the process. The team leader can select a default output or product output "as is" or he/she may tailor the output to suit the current requirements. Once the team leader has entered each of his/her supplier team outputs and their customers, the IPS will roll up the program data as shown in the Supplier Team Output Form 134, which shows each output, the customer(s) 146 and the status of that output as either accepted or rejected, as detailed below. The output data is suitably stored in the data base server as it is entered by each team leader (step 157).

To enforce an efficient and integrated planning process, the IPS application validates that all of the Supplier Team Output Forms have been completed (step 158) and all of the tasks addressed by an IPT (step 160) before allowing any of the team leaders (or facilitator) to proceed to the next step. The IPS application may also be configured to determine whether multiple IPTs are unnecessarily addressing the same task (step 162). If any of these conditions are unmet, the IPS application may prompt certain or all of the team leaders to resolve the issue. The IPS application can be configured to force resolution of some or all of these issues before allowing level 3 planning to proceed. For example, the team leaders may be required to click a "submit" button to indicate completion of the Output Form or to provide a simple verbal confirmation (or email) to the facilitator. The IPS application can then determine if all Output Forms have been completed and, if so, whether all tasks have been addressed. After a certain period of time or after a certain number or percentage of Output Forms have been submitted, the IPS application may prompt any remaining team leaders to complete and submit the Output Forms to keep the process moving. If all forms have been submitted but not all tasks addressed, the IPS application may prompt certain or all team leaders that some IPT must address the remaining tasks. If level 3 planning is performed live in a group setting then such 'prompts' are typically unnecessary. However, if the planning is being coordinated among geographically diverse and time-shifted participants the reminders may be needed to move the process along. For example, if participants are on opposite sides of the world the facilitator or IPS application could set a time deadline for submission of the completed form at each step thereby effectively managing a global and virtual planning process.

Once the Supplier Team Outputs 138 have all been entered and output criteria validated, the IPS application aggregates all of the Supplier Team Outputs 138 offered to each customer and makes them visible as Customer Team Inputs 164 with the supplier team 166 indicated on a Customer Team Input Form 168 (step 170). The team leader clicks "Inputs to My Team" and the IPS application provides them to the respective customer team leaders (step 172). These input forms 168 are thus tailored to each customer team based on the Supplier Team Outputs created in the previous step. The team leader can either accept or reject the Supplier Team Output 138 as a required input 164 by clicking the appropriate yes or no buttons 174 (step 176). Note, if team leaders were allowed to proceed to the input phase prior to all team leaders completing the output forms, required inputs would be missing causing the planning process to lose synchronization among the IPTs. The team leader may also enter a comment in comment field 178. Comments are used to help insure that both the supplier team leader and customer team leader have the same understanding of the offered output and accepted input to facilitate a smooth handoff. If a customer team is missing inputs (no supplier team offered them), the team leader may issue a request to certain or all other team leaders requesting that they offer the missing Supplier Team Output/Customer Team Input (step 179). The input data is suitably stored in the data base server as it is accepted/rejected by each team leader (step 180).

As each customer team leader accepts/rejects and possibly comments on an offered output, the IPS application cross-references that program data back to the Supplier Team Output form 134 to indicate the output as accepted or rejected 182 (step 184). The IPS application may facilitate resolution of any rejected I/O simply by indicating the output as rejected and only removing that output if either the Supplier Team deletes the output or the Customer Team accepts the output. The IPS application could be configured to enforce resolution of any rejections by preventing the process from moving forward until all rejections are resolved but this is typically not required (step 185).

Again to enforce an efficient and integrated planning process, the IPS application validates that all of the Customer Team Input Forms have been completed (step 186) before allowing any of the team leaders to proceed to the next step. The IPS application may require a team leader to hit a "submit" button or provide verbal confirmation to the facilitator to affirmatively indicate completion of the form. Alternately, the application can simply detect when each input 164 has been either accepted or rejected by each team leader. Similar to the output forms, the IPS application may prompt laggard team leaders to complete the forms so that the group can proceed to the next step.

Once the Customer Team Inputs 164 have all been selected and any input criteria validated, the team leader clicks on "Link Inputs & Outputs" and the IPS application generates and provides I/O Linking forms 190 tailored to the particular accepted inputs and offered outputs of each team (step 192). The I/O Linking form 190 is similar to Supplier Team Output form 134 accept that now under each accomplishment is a list of accepted inputs 164 and a list of offered outputs 138. The team leader clicks on each input 164 which brings up an "add link" form 194. The 'add link' form lists the input 164, the supplier team and any comments at the top and than lists possible offered outputs 138 under the appropriate Event and Accomplishment to which the input may be linked. The team leader checks the appropriate box or boxes 196 and suitably assigns a % overlap 198 for linked outputs 138 (step 200). The % overlap is an estimate of amount of time that the successor task can begin before the predecessor task finishes. The same input may support multiple outputs for a given accomplishment or outputs in different accomplishments. Alternately, linking could be performed by generating the add link form for each output and than selecting the supporting inputs. Furthermore, the IPS application may be configured to provide a list of default links for each input (output) to assist the linking process. The linkages are suitably stored in the data base server as they are created (step 201). Note, if team leaders were allowed to proceed to the linking phase prior to all team leaders completing the input forms, supplier teams would not know whether their outputs had been accepted/reject again causing the planning process to lose synchronization among the IPTs.

Figure 14:
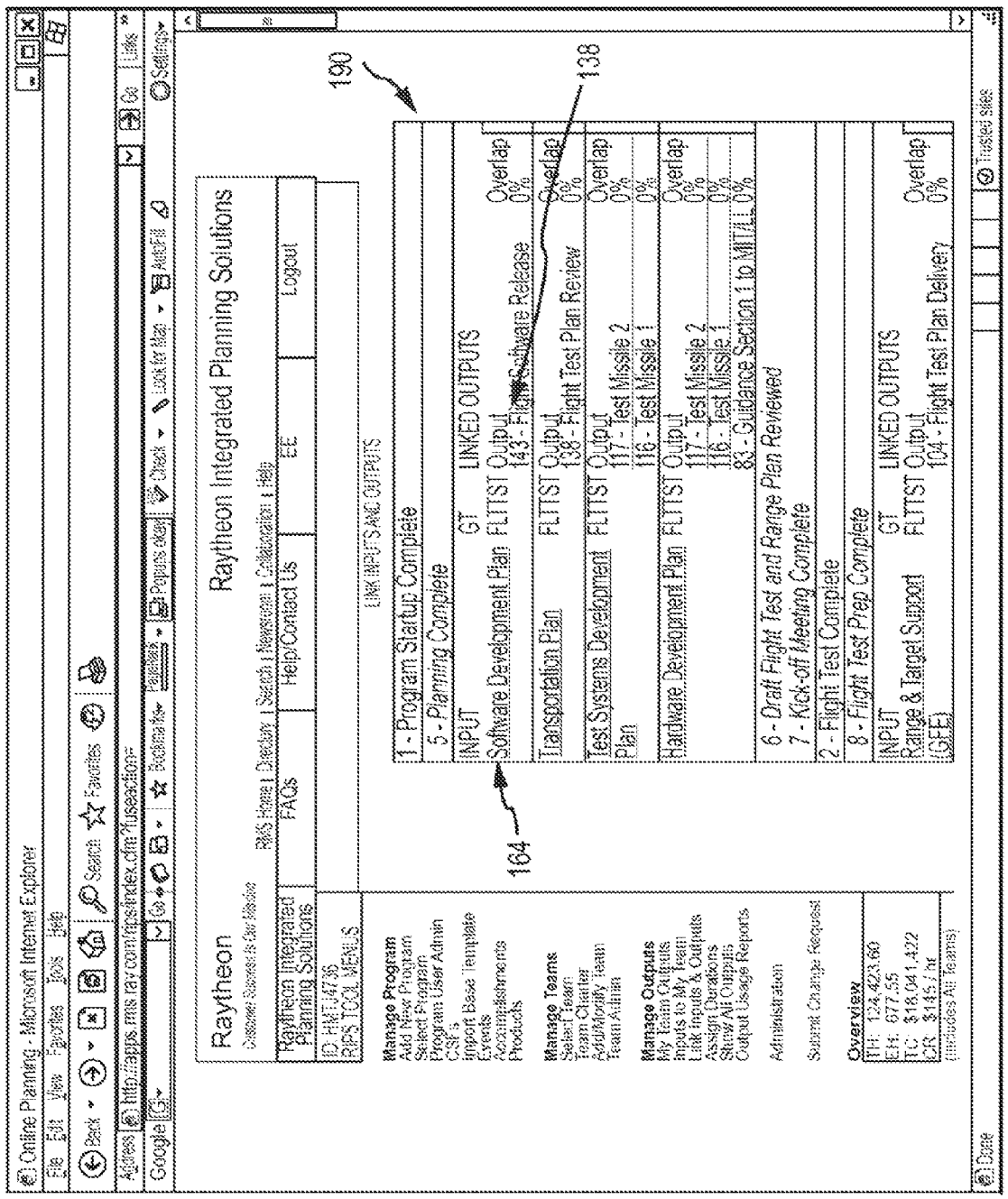
FIG. 14 is a web-based I/O link form listing the specified team outputs and accepted team inputs for each accomplishment.
Figure 15:
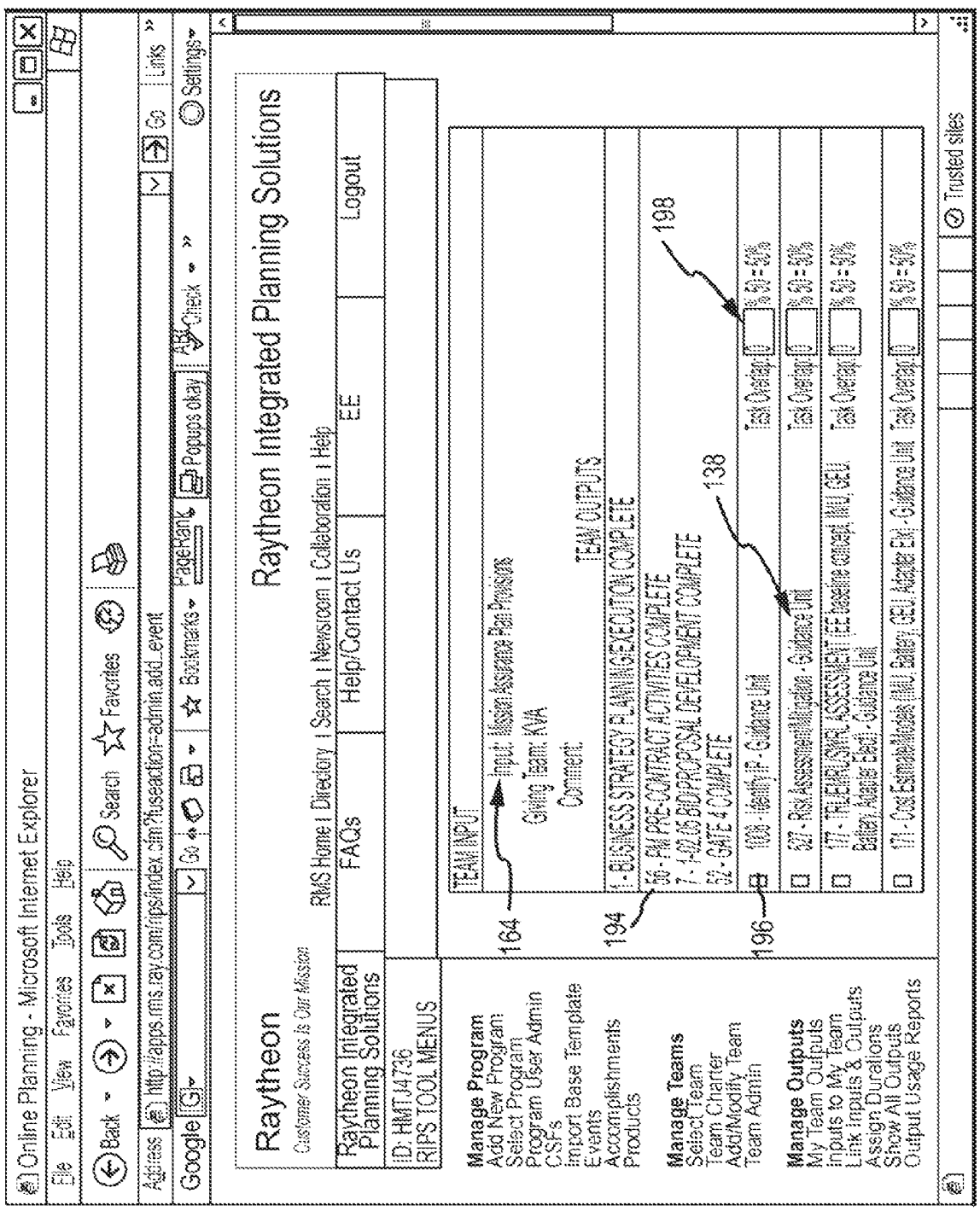
FIG. 15 is a web-based linking form for linking listed outputs to listed inputs.
Figure 17:
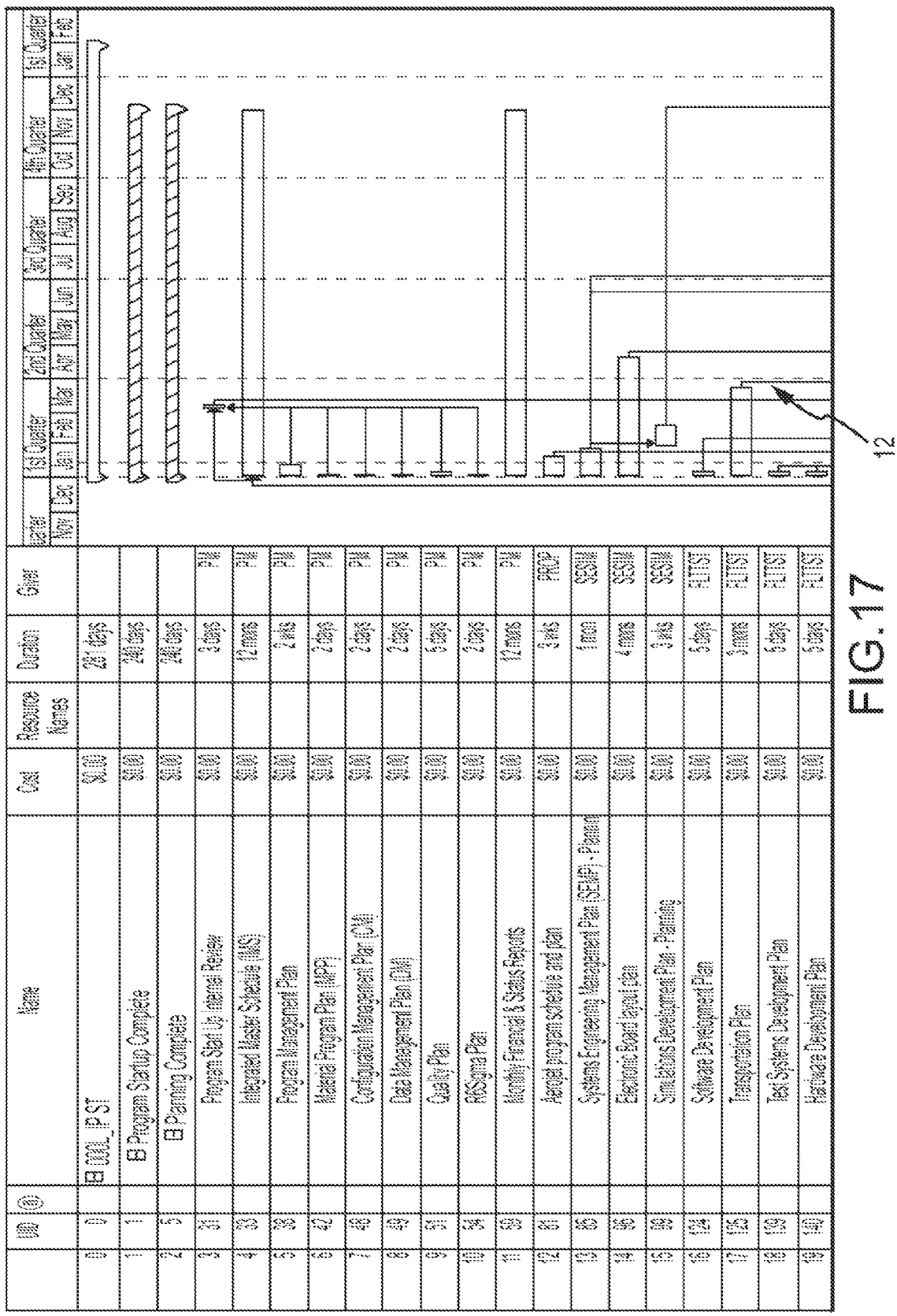
FIG. 17 is a snapshot of a MS Project Gantt chart that provides visibility of the entered program data as a networked program schedule at level 3 that can be saved on a storage media, printed onto hardcopy for distribution, displayed on local terminals or projected for display to the teams.

Once each I/O Linking form is complete (step 202), the IPS application rolls up the program data as shown in FIG. 14 showing the linked outputs 138 for each input 164, which can be viewed by clicking on "Show All Outputs". Again, completion can be indicated by the team leader clicking a 'submit' button, providing verbal confirmation to the facilitator or by the IPS application detecting the linkage of all team inputs. The IPS application is also preferably configured to validate the links (step 204). More specifically, the IPS application checks to make sure each input is linked to at least one output and flags any unlinked inputs. The application may also flag any outputs that are not linked to an input; although not disallowed it is unusual. The application also checks for and flags any circular links, which cannot be allowed. The occurrence of any circular links is suitably flagged to any IPT team leaders in the circular link. The IPS application may be configured to simply flag any non-complying links and rely on the team leaders with the possible assistance of the facilitator to resolve them in a timely manner or to enforce resolution of some or all of the non-complying links before allowing the planning process to proceed to the next step.

Once the Linkage forms are complete and possibly validated, the team leader clicks on "Assign Durations" and the IPS application generates a Team Duration & Resource Form 206 for each IPS based on that team's outputs and provides it to the corresponding team leader (step 208). At a minimum this form lists the team outputs and prompts the team leader to specify a duration 210 to generate the output (step 211). The duration will be linked to the receipt of any linked inputs and account for any specified overlap with those inputs. As shown, this form also preferably prompts the team leader to input the resources required to produce the output in the specified duration in terms of 'equivalent heads' (EH) 212. The IPS application computes an estimated cost 214 for each output and rolls that up to an estimated cost (budget) for each IPT 216 based on the program composite rate specified back in level 0. The IPS application also rolls up the estimated budgets for all IPTs to provide an estimated budget for the entire program. An Overview 217 is suitably displayed as part of each web-based form that tracks total hours (TH), equivalent heads (EH), total cost (TC) and composite rate (CR) for either a specific IPT or the entire program. In this example, a single program composite rate is used for all IPTs. Alternately, each IPT could have an assigned rate. As before, the IPS application stores the duration and resource data in the data base server as it is entered (step 218) and ensures that all forms have been completed (step 220) via keying of a submit button, verbal confirmation or by detecting when all durations & resources have been specified.

The IPS application, either with the aid of a facilitator, by prompting the team leaders and/or by automatically monitoring the entered program data, provides an efficient and structured approach to performing level 3 planning. The IPTs are forced to enter program data in a concurrent and parallel manner that is vastly superior to the serial ad hoc approaches currently used. The IPS application, either automatically or via the facilitator, enforces that all supplier team outputs be specified before moving to the input step and than all customer team outputs be accepted/rejected before moving to the link step. The ability of the IPS application to input the program data in parallel and to enforce the discipline on the IPT team leaders to complete all outputs and then complete all inputs before moving forward both streamlines the planning process and greatly improves the quality of the resulting networked program schedule.

Since all of the entered program data is suitably stored as it is created in the data base server, a scheduling application such as MS Project can generate a networked program schedule 12 at any point during the collaborative level 3 planning process for the entire program or any particular IPT (step 230). The program data generated by the IPS application is the same data that would be entered from a sticky-and-yarn schedule or via MS project only, and therefore the full functionality of MS Project or any other scheduling application is available for generating and manipulating the program data. The program schedule 12 may be printed to hardcopy (step 232), displayed one or more of the laptops (step 234) or projected to a screen (step 236). The IPS application facilitates an automated or semi-automated process for acquiring the program data that streamlines the planning process.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A web-based system for collaborative planning of a networked program schedule for specified tasks with a plurality of integrated product teams (IPTs), comprising:
   a central data storage server for storing program schedule data;
   a web application server;
   an integrated planning solution (IPS) application on said web application server;
   a plurality of team computer terminals for accessing the IPS application, said IPS application configured to acquire data collaboratively from IPT team leaders at the respective terminals by (a) providing an outputs form to the respective terminals listing the tasks for team leaders to specify supplier team outputs and their customers from among said IPTs or a final customer for the tasks, (b) once all of the outputs forms are completed, providing an inputs form to the respective terminals listing the supplier team outputs directed to the respective customer teams for the team leaders to accept or reject those outputs as team inputs, (c) once all of the inputs forms are completed, providing a linking form to the respective terminals that lists team inputs and outputs for the team leaders to link inputs to outputs for their respective teams, and (d) providing a duration form to the respective terminals listing the team outputs for the team leaders to assign durations to achieve the team outputs, said IPS application storing the program schedule data entered on the forms by the team leaders in said central data storage server;
   a program scheduling application accessible by at least a first administrative computer terminal to access the program schedule data stored on the central data storage server and generate a networked program schedule; and
   a communication network for interconnecting the central data server, web application server, administration computer terminal and said plurality of team computer terminals to exchange the web-based forms and program schedule data.

2. The web-based system of claim 1, wherein the tasks for an event-based program include a plurality of program products as deliverable outputs, a plurality of events and a number of accomplishments per event.

3. The web-based system of claim 2, wherein the outputs form lists the events, the accomplishments under each event, and the specified supplier team outputs, the customer and whether the customer accepted or rejected the output as a customer team input under each accomplishment.

4. The web-based system of claim 3, wherein the outputs form provides an add an output link which brings up a second outputs form to specify another supplier team output from a list including the program products, default outputs based on the IPT and the program products or new outputs, the customer team(s) or final customer believed to require the output, and the accomplishment the output supports.

5. The web-based system of claim 4, wherein the second outputs form allows the team leader to tailor the specified supplier team output.

6. The web-based system of claim 1, wherein once the forms are received from a previous step the IPS application either pushes the next form to the respective team leaders or makes the next form available by allowing the team leader to click on a link.

7. The web-based system of claim 1, wherein the inputs form allows the team leader to comment on the supplier team output.

8. The web-based system of claim 1, wherein the inputs form allows the team leader to generate a request for a required supplier team output.

9. The web-based system of claim 1, wherein the inputs form provides a list of default inputs based on each team's supplier team outputs.

10. The web-based system of claim 1, wherein the durations form also requires the team leader to specify resources to accomplish the output.

11. The web-based system of claim 1, wherein the linking form provides a list of default links for the team's customer team inputs and supplier team outputs.

12. The web-based system of claim 10, wherein the durations form provides lists of default durations and resources to accomplish the output.

13. The web-based system of claim 10, wherein the IPS application generates an estimated budget based on an assigned contract rate.

14. The web-based system of claim 1, wherein the IPS application shares entered program schedule data among the teams to facilitate completion of the forms including at least the supplier team outputs to the customer teams and the acceptance or rejection of the supplier team outputs as inputs by the customer team.

15. The web-based system of claim 1, wherein the IPS application validates the entered and linked program schedule data for compliance.

16. The web-based system of claim 15, wherein the IPS application identifies circular links and unlinked customer team inputs or supplier team outputs.

17. The web-based system of claim 1, wherein only the IPS application is allowed to enter or modify program data.

18. The web-based system of claim 1, further comprising:
a second administrative computer terminal for accessing the IPS application which provides forms to the terminal for a responsible party to specify the tasks and to create the plurality of IPTs.

19. A non-transitory computer-readable medium encoded with a web-based integrated planning solution (IPS) application for specified tasks with a plurality of integrated product teams (IPTs), said IPS application executing computer instructions to perform the following steps:
providing web-based forms over a first communication network to a plurality of team computer terminals to acquire program schedule data collaboratively from IPT team leaders at respective terminals including (a) providing an outputs form to the respective terminals listing the tasks for team leaders to specify supplier team outputs and their customers from among said IPTs or a final customer for the tasks, (b) once all of the outputs forms completed, providing an Inputs form to the respective terminals listing the supplier team outputs directed to the respective customer teams for the team leaders to accept or reject those outputs as team inputs, (c) once all of the inputs forms are completed, providing a linking form to the respective terminals that lists team inputs and outputs for the team leaders to link inputs to outputs for their respective teams, and (d) providing a duration form to the respective terminals listing the team outputs for the team leaders to assign durations to achieve the team outputs; and
storing the program schedule data entered on the forms by the team leaders in a central data storage server.

20. A web-based system for collaborative planning of a networked program schedule for specified tasks with a plurality of integrated product teams (IPTs), comprising:
a central data storage server for storing program schedule data;
a web application server;
an integrated planning solution (IPS) application on said web application server;
a plurality of team computer terminals for accessing the IPS application, said IPS application configured to acquire program schedule data collaboratively from IPT team leaders at the respective terminals by (a) sequentially providing forms to the terminals to force the team leaders to enter program data in parallel and in lock step to specify supplier team outputs including a customer team or final customer for the tasks, accept/reject supplier team outputs as customer team inputs, form team input-to-output links and specify output durations, (b) sharing entered program schedule data among the teams to facilitate completion of the forms, (c) validating the entered and linked program schedule data, and (d) storing the program schedule data in said central data storage server;
a program scheduling application accessible by at least a first administrative computer terminal to access the program schedule data stored on the central data storage server and generate a networked program schedule; and
a communication network for interconnecting the central data server, web application server, administration computer terminal and said plurality of team computer terminals.

21. The web-based system of claim 20, wherein the IPS application shares supplier team outputs with the customer team and shares the acceptance/rejection of those outputs with the supplier team.

22. The web-based system of claim 20, wherein the IPS application validates that the supplier team outputs address each of the tasks and validates that no disallowed input-to-output links are formed.

23. The web-based system of claim 20, wherein said outputs form provides an add an output link which brings up a second outputs form to specify another supplier team output.

24. A web-based system for collaborative planning of a networked program schedule for specified tasks with a plurality of integrated product teams (IPTs), comprising:
a central data storage server for storing program schedule data;
a web application server;
an integrated planning solution (IPS) application on said web application server;
a plurality of team computer terminals for accessing the IPS application, said IPS application configured to acquire data collaboratively from IPT team leaders at the respective terminals by (a) providing an outputs form to the respective terminals listing the tasks for team leaders to specify supplier team outputs and their customers from among said IPTs or a final customer for the tasks, said outputs form providing an add an output link which brings up a second outputs form to specify another supplier team output, (b) once all of the outputs forms are completed, providing an inputs form to the respective terminals listing the supplier team outputs directed to the respective customer teams for the team leaders to accept or reject those outputs as team inputs, (c) once all of the inputs forms are completed, providing a linking form to the respective terminals that lists team inputs and outputs for the team leaders to link inputs to outputs for their respective teams, and (d) providing a duration form to the respective terminals listing the team outputs for the team leaders to assign durations to achieve the team outputs, said IPS application storing the program schedule data entered on the forms by the team leaders in said central data storage server;
a program scheduling application accessible by at least a first administrative computer terminal to access the program schedule data stored on the central data storage server and generate a networked program schedule; and
a communication network for interconnecting the central data server, web application server, administration computer terminal and said plurality of team computer terminals to exchange the web-based forms and program schedule data.

* * * * *